(12) United States Patent
Fosnight et al.

(10) Patent No.: US 11,951,620 B2
(45) Date of Patent: Apr. 9, 2024

(54) CLIMBING ROBOT WITH COMPLIANT PINION DRIVE

(71) Applicant: Walmart Apollo, LLC, Bentonville, AR (US)

(72) Inventors: William J. Fosnight, Windham, NH (US); John G. Lert, Jr., Wakefield, MA (US); Michael Duquette, Candia, NH (US); Martin R. Elliott, Bedford, NH (US); Julian Warhurst, Portsmouth, RI (US); Charles W. Su, Stratham, NH (US); Alan Grant, Nashua, NH (US)

(73) Assignee: Walmart Apollo, LLC, Bentonville, AR (US)

( * ) Notice: Subject to any disclaimer, the term of this patent is extended or adjusted under 35 U.S.C. 154(b) by 699 days.

(21) Appl. No.: 17/158,890

(22) Filed: Jan. 26, 2021

(65) Prior Publication Data

US 2021/0229271 A1   Jul. 29, 2021

Related U.S. Application Data

(60) Provisional application No. 62/966,350, filed on Jan. 27, 2020.

(51) Int. Cl.
  *B25J 9/10* (2006.01)
  *B25J 5/00* (2006.01)

(52) U.S. Cl.
  CPC ............. *B25J 9/1035* (2013.01); *B25J 5/007* (2013.01)

(58) Field of Classification Search
  CPC .. B25J 9/1035; B25J 5/007; B25J 5/02; B66F 9/06; B66F 9/12; B66F 9/122; B66F 9/063
  See application file for complete search history.

(56) References Cited

U.S. PATENT DOCUMENTS

| | | | |
|---|---|---|---|
| 3,257,860 A | 6/1966 | Runde et al. | |
| 3,443,449 A | 5/1969 | Kotarski | |
| 11,008,166 B2 * | 5/2021 | Gravelle | ................ B65G 1/065 |
| 11,034,532 B2 * | 6/2021 | Wehner | ................ B65G 1/1375 |
| 11,420,854 B2 * | 8/2022 | Gravelle | ................ B66F 9/122 |
| 2013/0074624 A1 | 3/2013 | Lai et al. | |
| 2015/0075307 A1 | 3/2015 | Schneider et al. | |
| 2017/0313514 A1 | 11/2017 | Lert, Jr. et al. | |
| 2019/0337733 A1 | 11/2019 | Wehner et al. | |
| 2019/0375589 A1 | 12/2019 | Gravelle et al. | |

(Continued)

FOREIGN PATENT DOCUMENTS

| | | |
|---|---|---|
| EP | 3877297 | 9/2021 |
| EP | 3878773 | 9/2021 |

(Continued)

OTHER PUBLICATIONS

English language Abstract for JPS61175369 published Aug. 7, 1986.

(Continued)

*Primary Examiner* — Kevin Hurley
*Assistant Examiner* — Michael R Stabley
(74) *Attorney, Agent, or Firm* — Fitch, Even, Tabin & Flannery, LLP

(57) ABSTRACT

An automated order fulfillment system and mobile robot are disclosed, where the mobile robot includes a compliant drive for moving between levels of a multilevel storage structure.

30 Claims, 44 Drawing Sheets

(56) References Cited

U.S. PATENT DOCUMENTS

| | | | |
|---|---|---|---|
| 2020/0087067 A1* | 3/2020 | Fosnight | ............... F16H 55/26 |
| 2021/0139302 A1 | 5/2021 | Gravelle et al. | |

FOREIGN PATENT DOCUMENTS

| | | |
|---|---|---|
| JP | S61175369 | 8/1986 |
| JP | H01172607 | 7/1989 |
| JP | 05039814 | 2/1993 |
| JP | 2018070382 | 5/2018 |
| WO | 2005010405 | 2/2005 |
| WO | 2016172793 | 11/2016 |
| WO | 2016196815 | 12/2016 |

OTHER PUBLICATIONS

English language Abstract for WO2005010405 published Feb. 3, 2005.

English language Abstract for JPH01172607 published Jul. 7, 1989.

International Search Report and Written Opinion dated Dec. 11, 2019 in International Patent Application No. PCT/US2019/050867.

Office Action dated Sep. 2, 2020 in Taiwanese Patent Application No. 108133101.

Office Action dated Nov. 2, 2020 in Japanese Patent Application No. 2019-166804.

Response to Office Action, with English translation of amendments made therein, filed Mar. 3, 2021, in Taiwanese Patent Application No. 108133101

Response to Office Action, with English translation of claims as amended therein, filed Mar. 9, 2021 in Japanese Patent Application No. 2019-166804.

Response to Office Action filed Nov. 1, 2021 in European Patent Application No. 19783392.4.

Office Action dated Aug. 1, 2022 in Japanese Patent Application No. 2021-096055.

English language Abstract for JP2018070382 published May 10, 2018.

Response to Office Action dated Jan. 25, 2023, with English translation of claims as amended therein, in Japanese Patent Application No. 2021-096055.

Office Action dated Jan. 6, 2023 in U.S. Appl. No. 16/567,881.

Response to Office Action dated Apr. 6, 2023 in U.S. Appl. No. 16/567,881.

* cited by examiner

CLIMBING ROBOT WITH COMPLIANT PINION DRIVE

CROSS-REFERENCE TO RELATED APPLICATION(S)

This application relates to U.S. Provisional Patent Application Ser. No. 62/966,350 entitled "Climbing Robot with Compliant Pinion Drive" and having a file date of Jan. 27, 2020, for all subject matter common to both applications. The disclosure of said provisional application is hereby incorporated by reference in its entirety.

FIELD OF THE INVENTION

The exemplary and non-limiting embodiments described herein relate generally to robot travel within an automated retail supply chain storage and retrieval system, and more particularly to a compliant pinion drive on a mobile robot for tolerant meshing with a gear rack when the robot engages the gear rack for vertical climbing.

BACKGROUND

An automated order fulfillment system for use in supply chains may fulfill orders for individual product items, also referred to herein as "eaches." Traditional order fulfillment facilities store eaches in containers in a multi-level storage structure with a vertical and horizontal array of storage spaces. The automated order fulfillment system further includes mobile robots which move around the storage structure to transfer containers or totes to and from the storage spaces within the structure. In one example, the storage structure may include horizontal floors or platforms around at least a portion of the storage structure enabling mobile robots to travel to and from the storage structure, horizontal tracks enabling mobile robots to travel horizontally to and from storage spaces on a given level, and vertical towers enabling mobile robots to travel vertically between levels.

It is known to provide pinion gears on opposed sides of the mobile robots, which mesh with toothed racks in opposed sides of the vertical towers to enable vertical travel. In operation, a mobile robot may approach a vertical tower from a horizontal floor, platform or rail. Once positioned in the vertical tower, motors in the mobile robot extend the pinion gears on opposed sides of the mobile robot along their common axis of rotation until the pinion gears engage within the racks. Rotation of the pinion gears may thereafter raise or lower the robot in the vertical tower. With this method of engagement, it may happen that a pinion gear does not mesh properly with the teeth of a rack as the pinion gear advances toward and into the rack, possibly even jamming against a side of the rail to prevent meshed engagement.

SUMMARY

Embodiments of the present technology relate to a compliant pinion drive on a mobile robot for tolerant meshing with a rack when the robot engages the rack for vertical climbing.

In one example, the present technology relates to a mobile robot configured to travel in a vertical or inclined passage within an automated retrieval and storage system, the passage comprising a rack having gear teeth, the mobile robot comprising: a pinion gear configured to rotate on a shaft about an axis of rotation, the shaft configured to extend axially along the axis of rotation to position the pinion gear in meshing engagement with the rack when the mobile robot is to travel in the passage, the pinion gear comprising gear teeth having chamfered lead in portions configured to facilitate meshing engagement of the pinion gear with the rack without jamming upon axial extension of the shaft.

In another example, the present technology relates to a mobile robot configured to travel in a vertical or inclined passage within an automated retrieval and storage system, the passage comprising a linear drive mount, the mobile robot comprising: a compliant drive assembly for moving the mobile robot in the passage, the compliant drive assembly comprising: a motor mounted within the mobile robot, the motor comprising a first spline; a shaft having a second spline, the shaft configured to be rotated about an axis of rotation by the motor by the first spline of the motor exerting force on the second spline of the shaft, the shaft further configured to be extended axially along the axis of rotation; a drive gear mounted on an end of the shaft, the drive gear configured to move into engagement with the linear drive mount upon extension of the shaft; wherein the first and second splines are configured for rotational play between the first and second splines, the rotational play allowing a degree of free rotation of the drive gear relative to the linear drive mount to prevent jamming of the drive gear against the linear drive mount when the drive gear moves into engagement with the linear drive mount upon extension of the shaft.

In a further example, the present technology relates to an order fulfilment system, comprising: a multilevel storage structure having storage locations in different levels, and a vertical or inclined passage passing between the different levels, the passage comprising a linear drive mount along its length; and a mobile robot configured to travel between the levels in the passage, the mobile robot comprising: a motor mounted within the mobile robot, the motor comprising a first spline; a shaft having a second spline, the shaft configured to be rotated about an axis of rotation by the motor by the first spline of the motor exerting force on the second spline of the shaft, the shaft further configured to be extended axially along the axis of rotation; a drive gear mounted on an end of the shaft, the drive gear configured to move into engagement with the linear drive mount upon extension of the shaft; wherein the first and second splines are configured for rotational play between the first and second splines, the rotational play allowing a degree of free rotation of the drive gear relative to the linear drive mount to prevent jamming of the drive gear against the linear drive mount when the drive gear moves into engagement with the linear drive mount upon extension of the shaft.

In another example, the present technology relates to a method of transporting a mobile robot along a vertical or inclined passage between storage levels in an order fulfillment facility, the passage comprising a linear drive mount, comprising the steps: extending a drive gear of the mobile robot from a first position spaced from the linear drive mount to a second position where the drive gear is engaged with the drive mount, the drive gear mounted to a shaft; rotating the shaft and drive gear by a motor, the motor having a first spline and the shaft having a second spline, the shaft rotating by a force exerted by the first spline on the second spline; and preventing improper seating of the drive gear against the linear drive mount by, at least in part, providing a degree of play between the first and second splines, the play allowing a degree of free rotation of the drive gear relative to the linear drive mount as the drive gear extends from the first position to the second position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE FIGURES

The present technology will now be described with reference to the figures in which.

DETAILED DESCRIPTION

Figure 1:
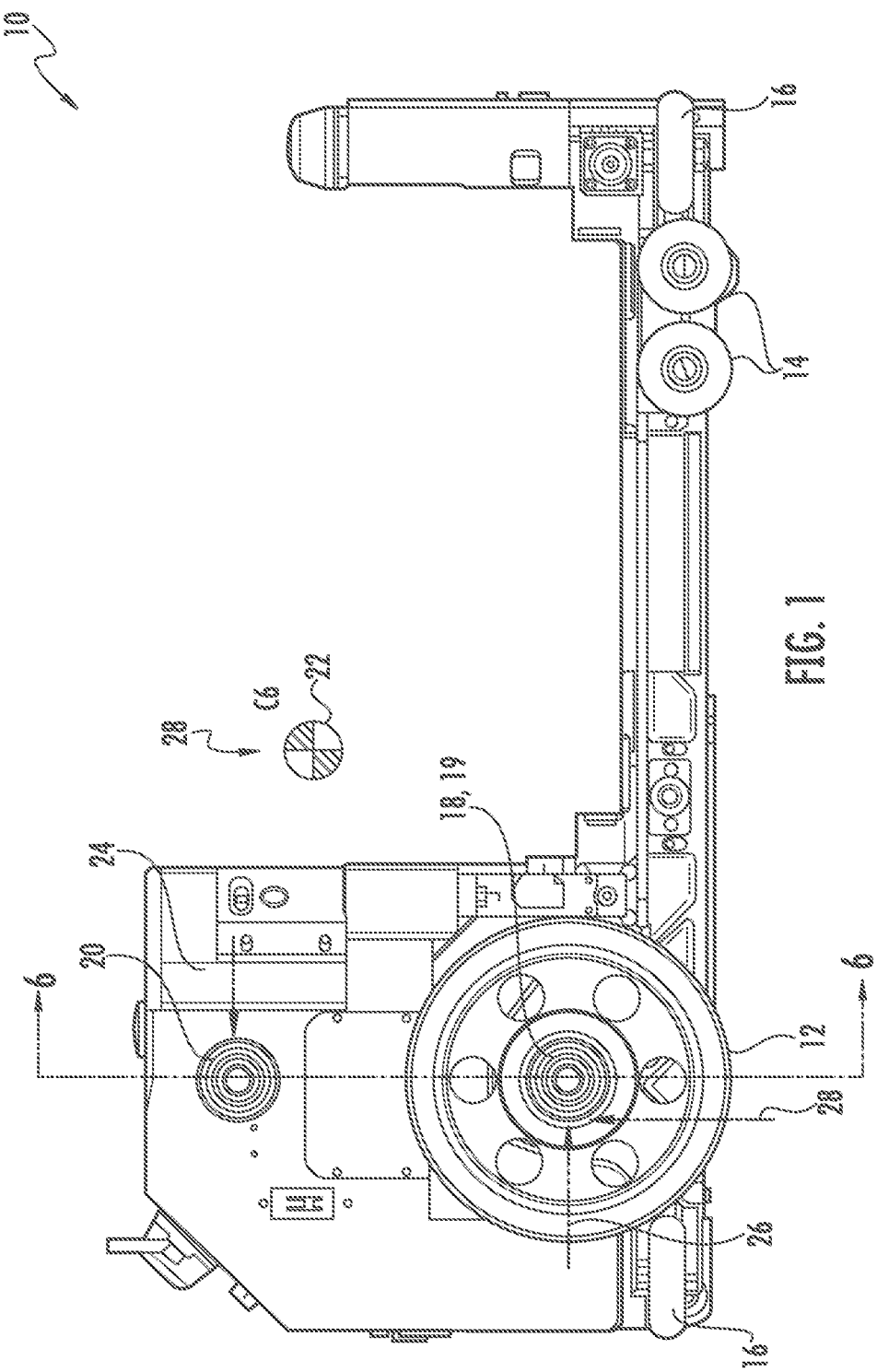
FIG. 1 is a side view of a climbing robot.

Referring now to FIG. 1, there is shown a side view of a climbing robot 10. Climbing robot 10 is configured for use within an order fulfillment system and may have features as described in US Patent Publication Number US 2017/0313514 A1 dated Nov. 2, 2017 and entitled "Order Fulfillment System" which is incorporated by reference herein in its entirety. An order fulfillment system has multilevel tote storage and retrieval structure, autonomous robotic vehicles 10 configured to pick, transport and place one or more tote within the order fulfillment system, workstations configured to accommodate a picker (human, automated or otherwise) that transports one or more eaches from a tote, for example a product tote containing multiple common eaches to be picked, on one of the autonomous mobile robots to a put location, for example an order tote that has a combination of different eaches that reflects a full or partially fulfilled order, that may be on another of the autonomous mobile robots at the workstation, transit decks configured to support, stage and buffer the autonomous robots 10 between the storage and retrieval structure and the workstations, a dispense station where totes containing fulfilled orders are discharged from the order fulfillment apparatus and a decant or input interface (not shown) configured to replenish the apparatus. Climbing robot 10 has drive wheels 12, support wheels 14, guide rollers 16, pinion 18 and counterwheel 19 and counterwheel 20. As will be described in greater detail below, pinion 18 and counterwheel 19 and counterwheel 20 selectively engage a rack allowing the robot 10 to climb or descend vertically. While climbing, counterwheel 19 and counterwheel 20 react to the cantilevered weight of robot 10 having CG 22 where force 24 reacts with counterwheel 20 and force 26 reacts with counterwheel 19. Pinion 18 further vertically supports the weight 28 of robot 10 while the counterwheels react the moment.

Figure 2:
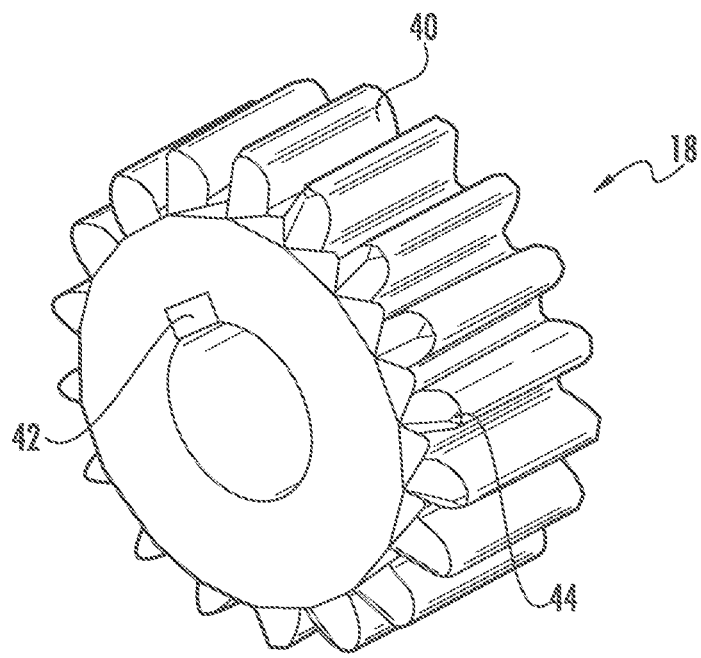
FIG. 2 is an isometric view of a pinion.

Referring now to FIG. 2, there is shown an isometric view of pinion 18. Pinion 18, also referred to herein as a drive gear, has teeth 40 and keyway 42. Teeth 40 have a chamfered lead in portion 44 that is provided to prevent jamming or missed engagement when engaging the rack.

Figure 3:
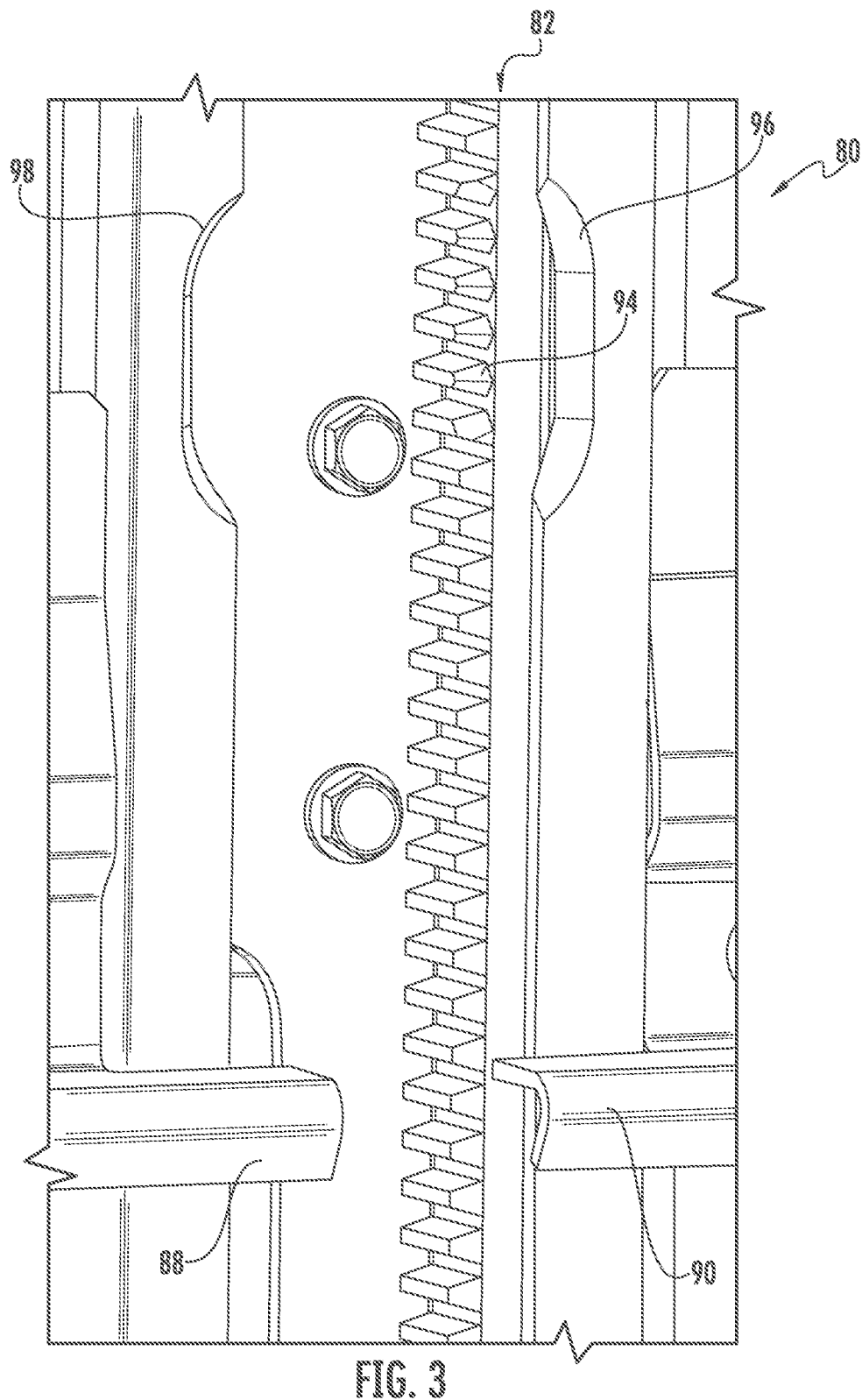
FIG. 3 is an isometric view of a rack structure.
Figure 4:
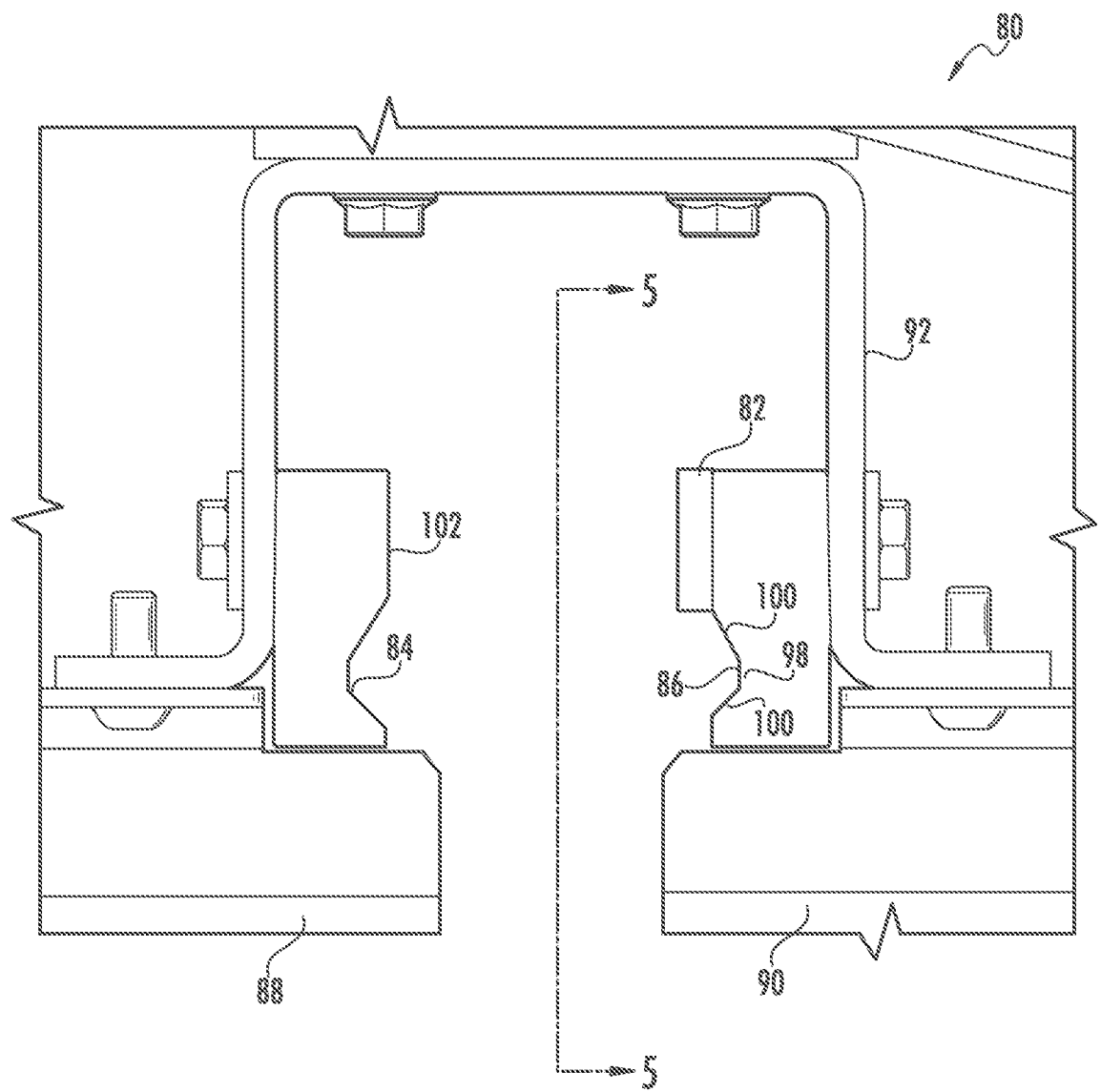
FIG. 4 is a top view of a rack structure.
Figure 5:
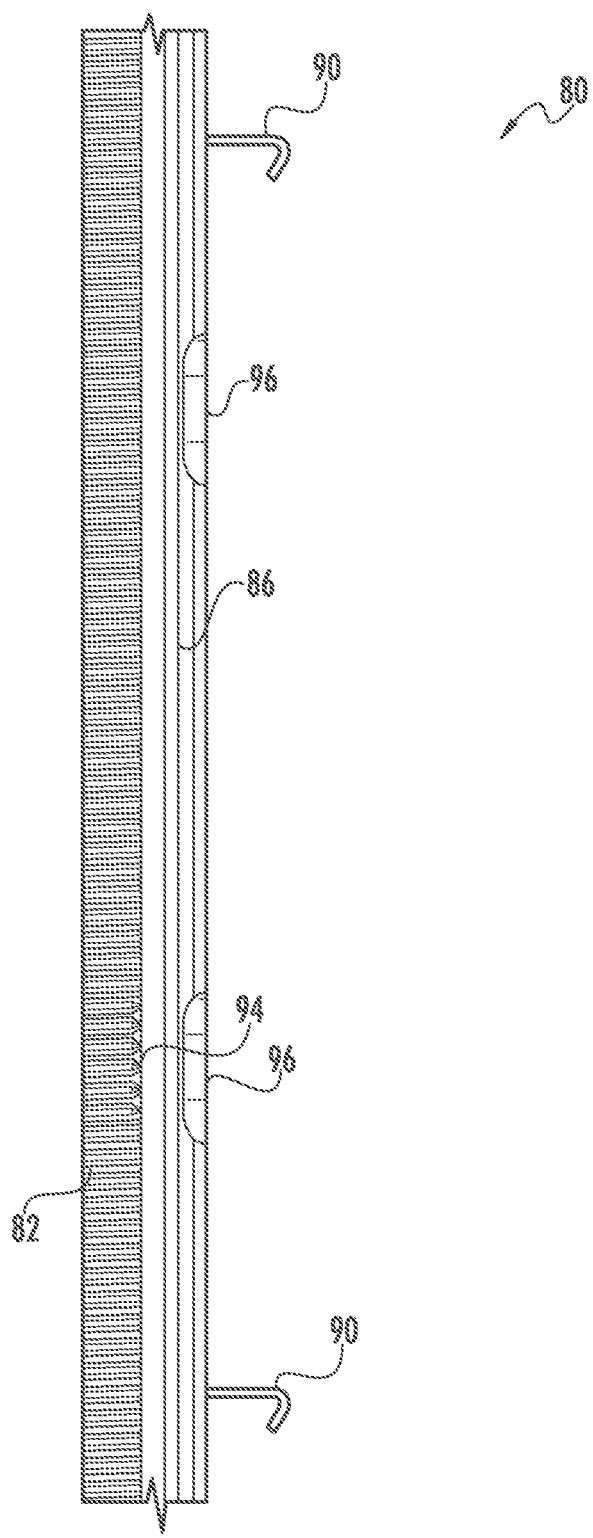
FIG. 5 is a side section view of a rack structure.

Referring now to FIG. 3, there is shown an isometric view of rack structure 80. Referring also to FIG. 4, there is shown a top view of rack structure 80. Referring also to FIG. 5, there is shown a partial a side section view of rack structure 80. Rack structure 80 has rack 82 (also referred to herein as a linear drive mount), counter wheel support surfaces 84, 86, robot support rails 88, 90 and frame 92. The teeth of rack 82 have a chamfered lead in portion 94 that is provided to prevent jamming or missed engagement when the pinion engages rack 82. Cut outs 96, 98 are positioned where the counterwheels engage the rack structure. Backer bar surface 102 is provided such that an engaged pinion cannot jump or skip rack teeth due to the pinion hitting backer bar 102 prior to disengaging the rack teeth. Counter wheel support surfaces 84, 86 are provided as a vee-wheel track used to center vee-wheels as will be described in greater detail, where by example, surface 86 has a flat bottom portion 98, for example to engage a mating surface on a counterwheel to set the pinion gear teeth engagement without bottoming out the pinion gear, serves as lead in of pinion gear into the rack/backer bar space. Vee portion 100 is further provided to mate with mating chamfered portions of a counterwheel to center the wheel in groove 86.

Figure 6:
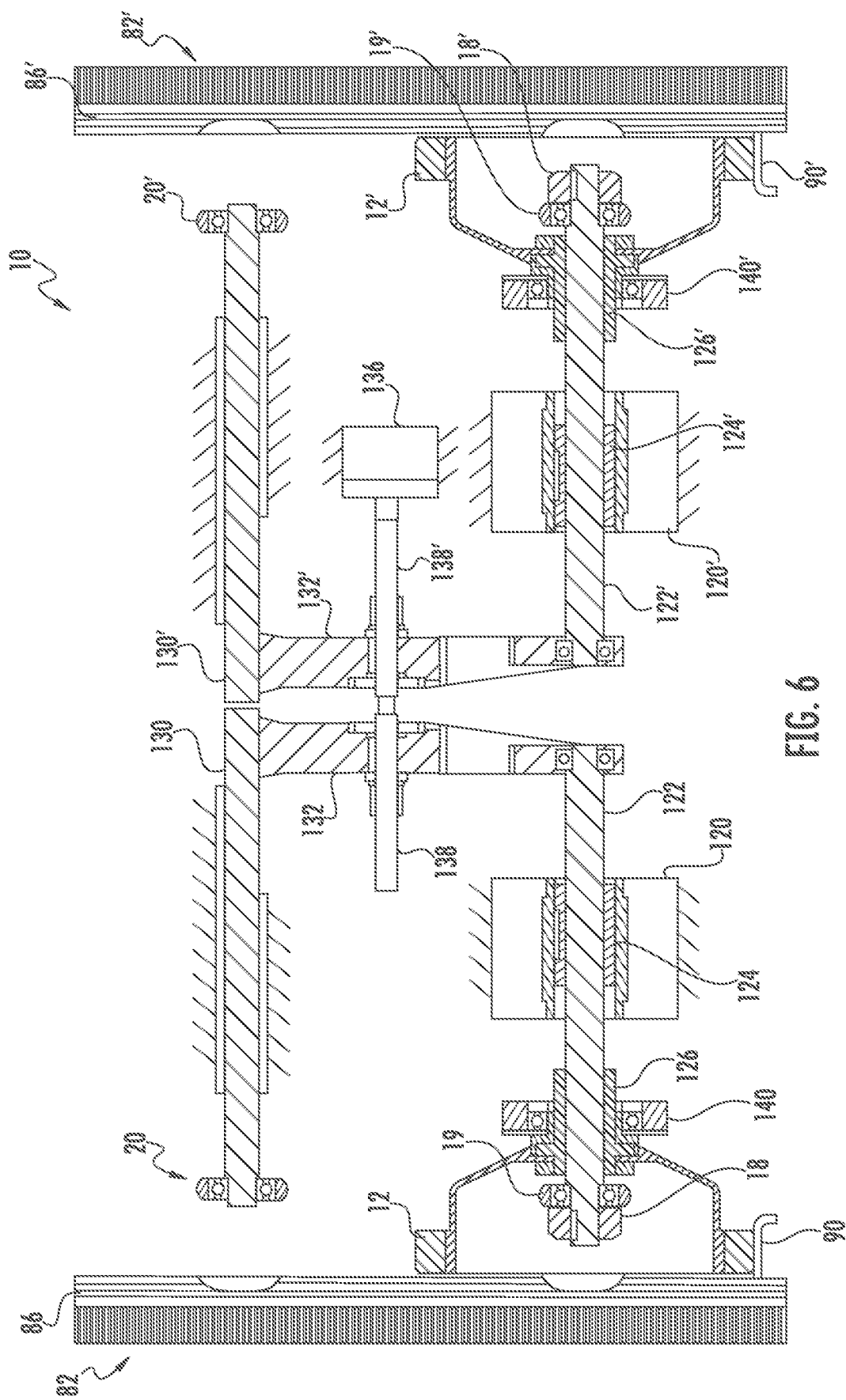
FIG. 6 is a partial section view of a climbing robot.

Referring now to FIG. 6, there is shown a partial section view of a climbing robot 10. Racks 82, 82' are positioned on opposing sides of robot 10. Similarly, support rails 90, 90' are positioned on opposing sides of robot 10. In FIG. 6, the robot is shown with drive wheels 12, 12' supported by support rails 90, 90'. As will be described with respect to FIGS. 6-10, robot 10 will engage racks 82, 82' to climb vertically. Wheels 12, 12' are independently driven by motors 120, 120'. Independently driven motors 120, 120' are shown grounded to the frame of robot 10 where independently driven motors 120, 120' transmit torque to shafts 122, 122' via spline or bushing 124, 124' where pinions 18, 18' and counterwheels 19, 19' are coupled to shafts 122, 122'. Similarly shafts 122, 122' transmit torque to wheels 12, 12' via spline or bushing 126, 126'. Counter wheels 20, 20' are coupled to shafts 130, 130' respectively where trunnion 132 couples shafts 122 and 130 and where trunnion 132' couples shafts 122' and 130'. Motor 136 is provided coupled to opposite hand lead screws 138, 138' such that rotation of motor 136 causes shafts 122, 130 to move in opposition to shafts 122', 130' to selectively engage and disengage the racks 82, 82'. It is noted that counterwheels 19, 20 have mating surfaces that engage counter wheel support surfaces 84, 86 that are provided as a vee-wheel track is used to center vee-wheels or counterwheels 19, 20. After engagement, servo motor or motor 136 can be disabled and the lead screws can be allowed to back drive such that the counterwheels 19, 20 mating surfaces engage and follow counter wheel support surfaces 84, 86 and by monitoring an encoder on motor 136 the encoder position can be recorded during vertical or other motion to measure the separation of the counter wheel tracks (e.g. 86, 86') in the storage system. In addition to a monitoring and measurement function, limits may be set, for example if the separation of the counterwheels is less than a predetermined minimum then the motor 136 may be reengaged pushing out the counterwheels. A similar feature may be provided for wheels 12, 12', for example, to measure the width of the track or set limits or otherwise. Here and similarly, a motor may be provided coupled to opposite hand lead screws (not shown) such that rotation of the motor causes trucks 140, 140' and hence wheels 12, 12' to move in opposition to selectively engage and disengage the support rails 90, 90'. As will be described in greater detail, shafts 122, 122' are provided with features such that there is provided play between shaft 122 and wheel 12 via spline 126 such that upon the pinion 18 engagement with rack 82 the system is not over constrained. By way of example, were play not provided if the pinion was out of alignment with the rack, the friction between the wheel and the wheel support would prevent smooth engagement. In the relative position between spline 126 and shaft 122 shown in FIG. 6, there is no rotational play between spline 126 and shaft 122.

Figure 7:
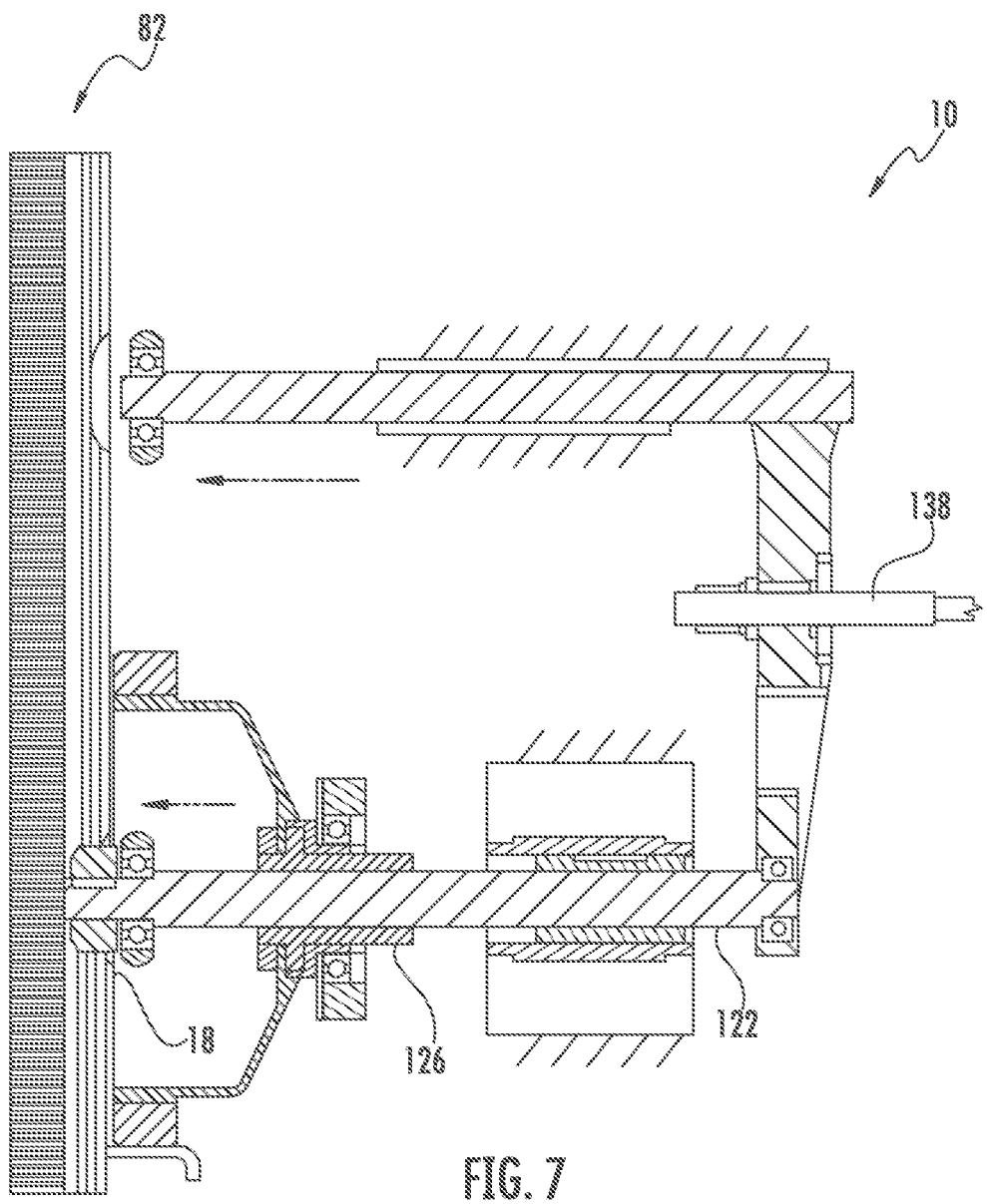
FIG. 7 is a partial section view of a climbing robot.

Referring now to FIG. 7, there is shown a partial section view of a climbing robot 10 showing one side for clarity. In the state shown in FIG. 7, lead screw 138 is rotated such that pinion 18 is just about to engage with rack 82. In the relative position between spline 126 and shaft 122 shown in FIG. 7, there is rotational play between spline 126 and shaft 122 such that pinion 18 can freely engage rack 82.

Figure 8:
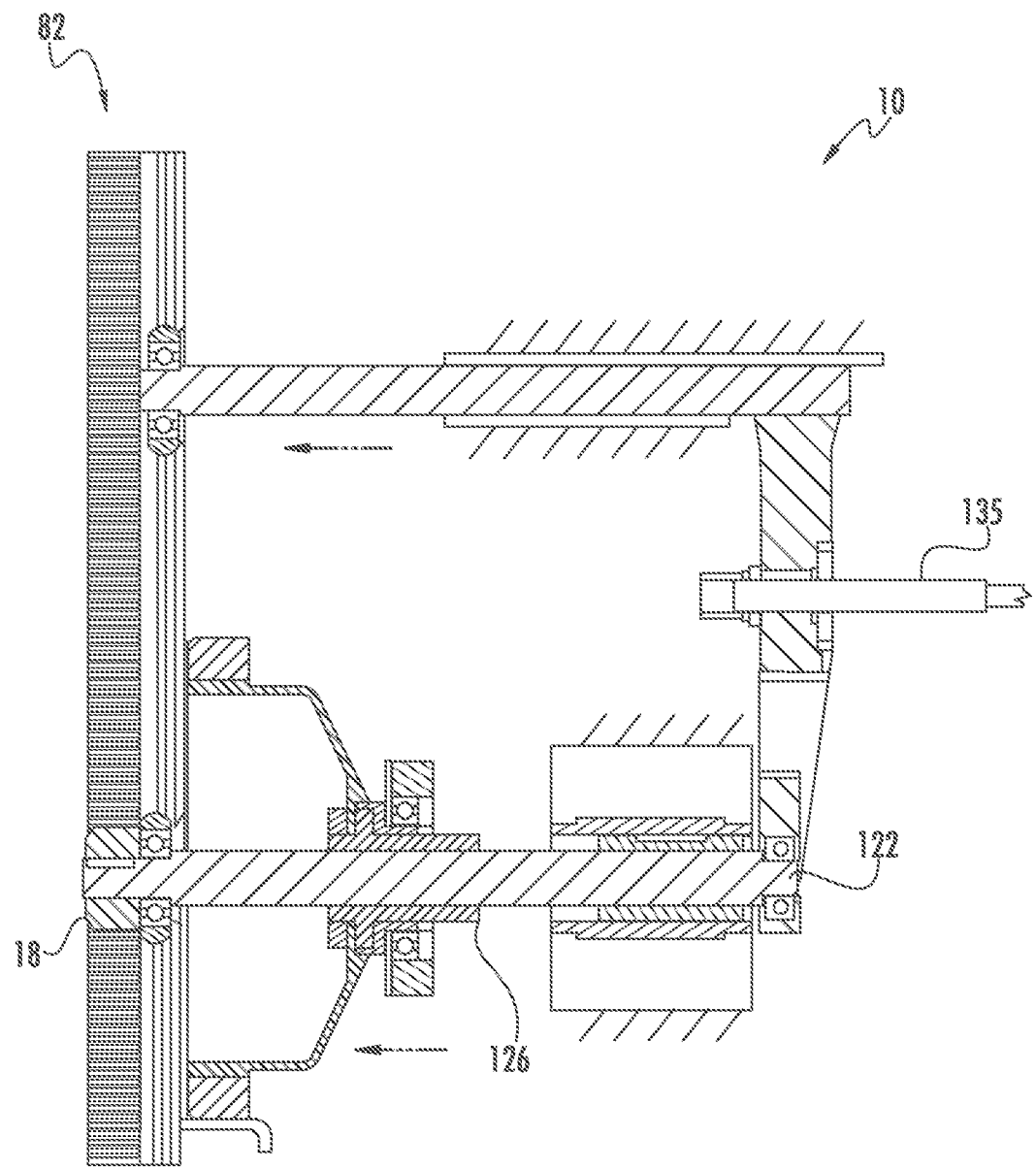
FIG. 8 is a partial section view of a climbing robot.

Referring now to FIG. 8, there is shown a partial section view of a climbing robot 10 showing one side for clarity. In the state shown in FIG. 8, lead screw 138 is rotated such that pinion 18 is fully engaged with rack 82. In the relative position between spline 126 and shaft 122 shown in FIG. 8, there is rotational play between spline 126 and shaft 122 such that pinion 18 can freely engage rack 82. In the event pinion 18 fails to engage rack 82, a retry feature may be provided. Here, in the event there is an interference/overlap of the pinion and rack gear teeth edges, the pinion may be retracted and rotated using the drive motor (while still in the compliant portion of the shaft), and the pinion reinserted back into the rack. By way of example, the pinion may be rotated slightly forward (driving up) and then reinserted for a successful engagement of pinion 18 with rack 82. Note that the sequence referred to with respect to FIGS. 6-10 may be reversed to disengage the pinion and engage the drive wheels for subsequent horizontal movement with the drive wheels.

Figure 9:
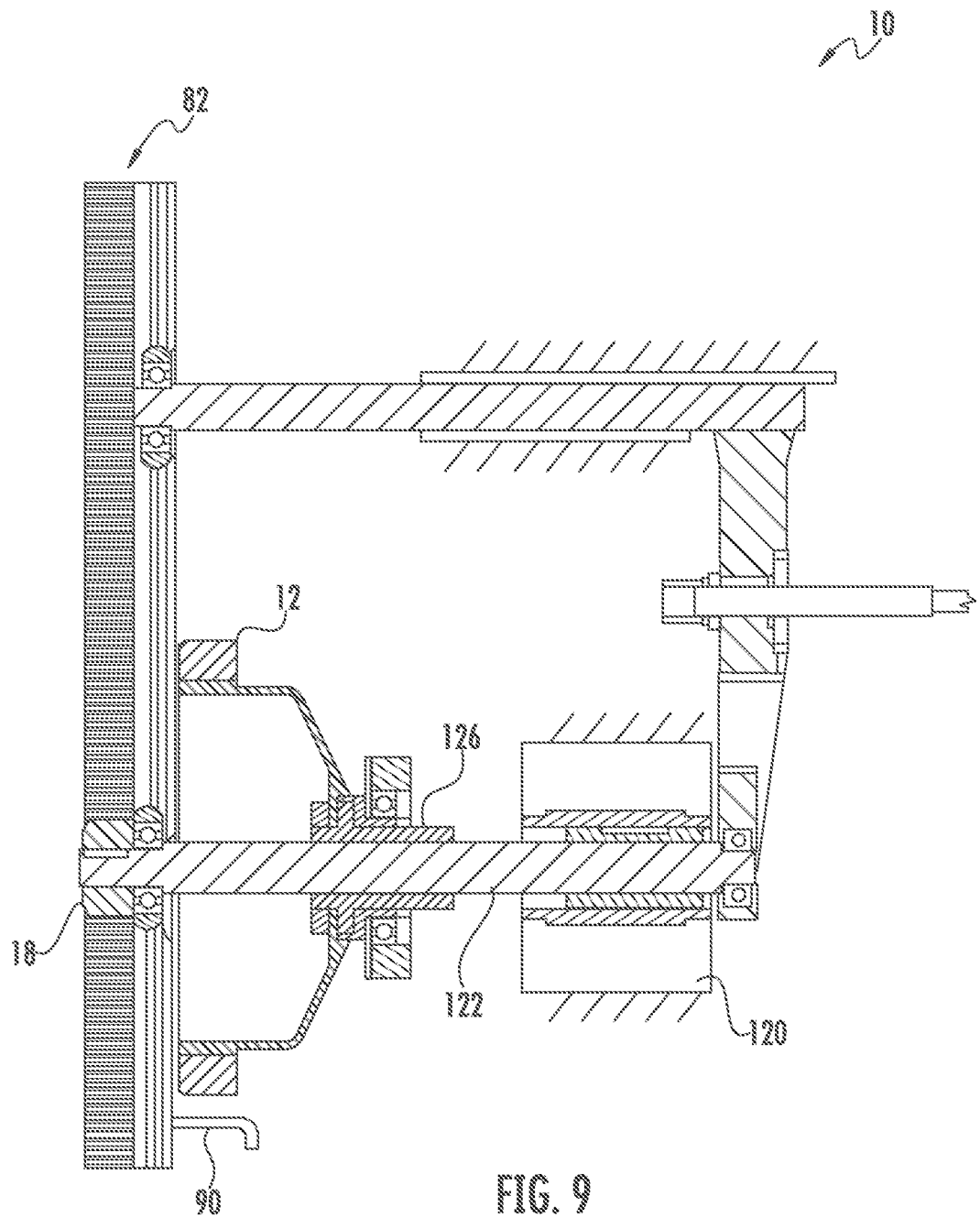
FIG. 9 is a partial section view of a climbing robot.

Referring now to FIG. 9, there is shown a partial section view of a climbing robot 10 showing one side for clarity. In the state shown in FIG. 9, pinion 18 is fully engaged with rack 82 and motor 120 applies torque to shaft 122 and pinion 18 such that the climbing robot is raised separating wheel 12 from support rail 90. In the relative position between spline 126 and shaft 122 shown in FIG. 9, there is rotational play between spline 126 and shaft 122 such that wheel 12 can freely separate from rail 90.

Figure 10:
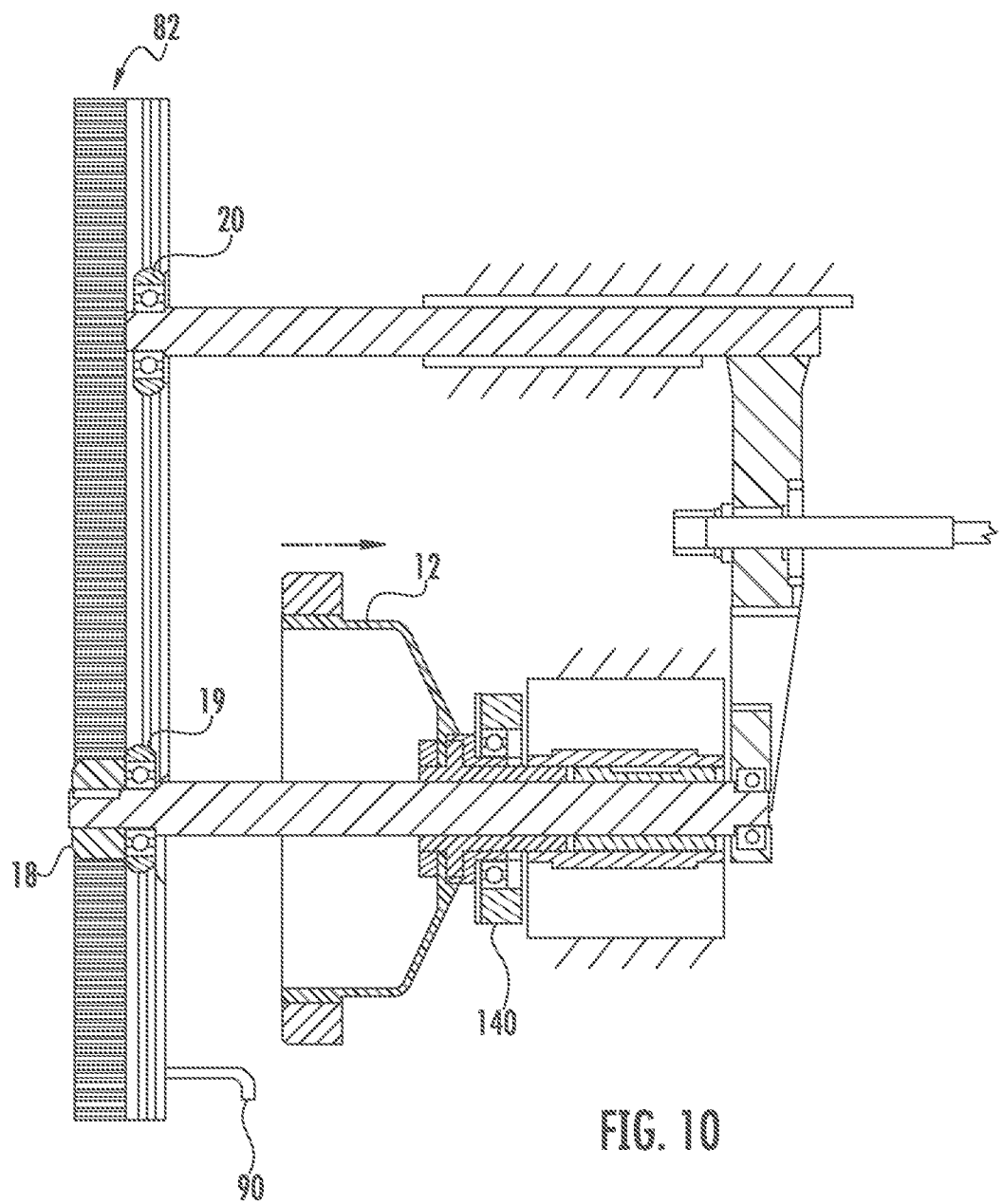
FIG. 10 is a partial section view of a climbing robot.

Referring now to FIG. 10, there is shown a partial section view of a climbing robot 10 showing one side for clarity. In the state shown in FIG. 10, pinion 18 is fully engaged with rack 82 and motor 120 applies torque to shaft 122 and pinion 18 such that the climbing robot is fully supported by pinion 18 and counter wheels 19, 20. Truck 140 is retracted by a separate motor (not shown) such that wheel 12 clears support rail 90. In the relative position between spline 126 and shaft 122 shown in FIG. 10, there is no rotational play between spline 126 and shaft 122 such that as the wheel is stopped there is no play such that during deceleration the wheel remains centered on the compliance zone.

Figure 11:
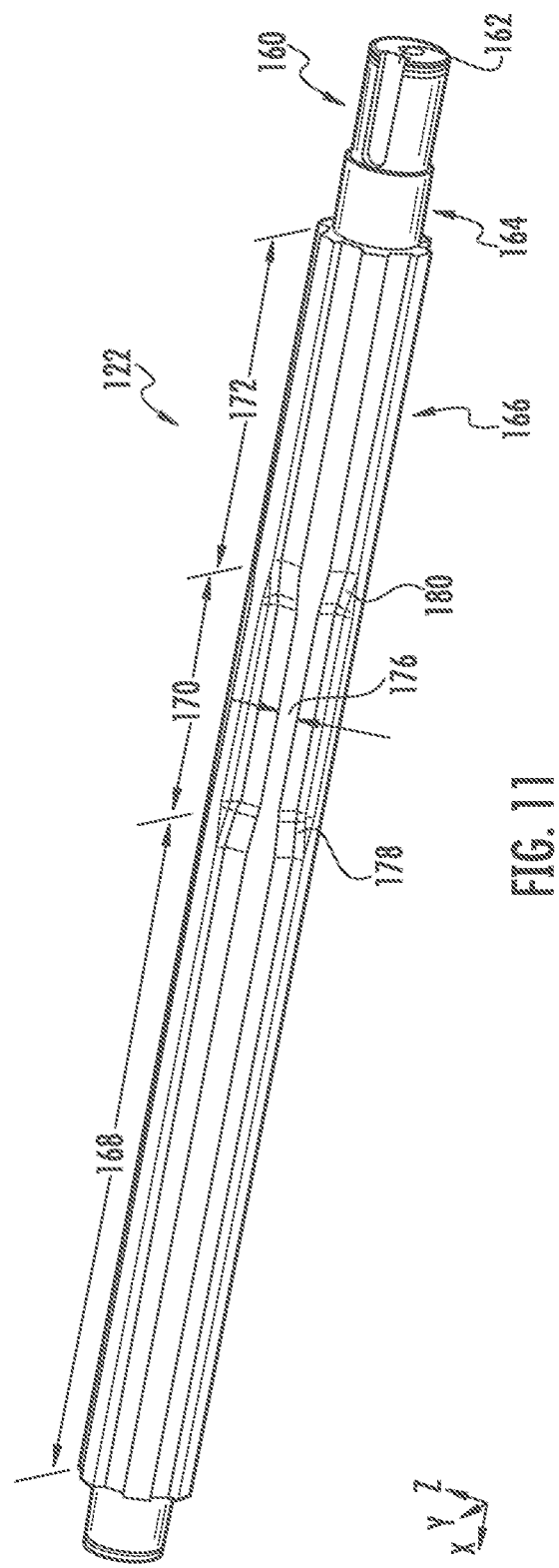
FIG. 11 is an isometric view of a shaft.
Figure 12:
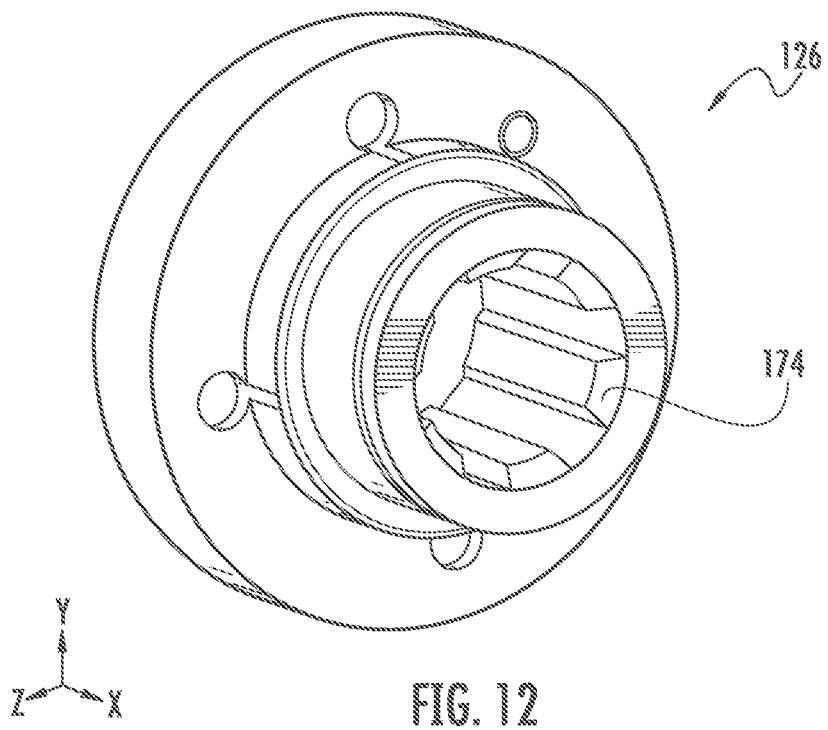
FIG. 12 is an isometric view of a hub.

Referring now to FIG. 11, there is shown an isometric view of a shaft 122. Referring also to FIG. 12, there is shown an isometric view of a spline hub 126. Spline hub 126 mounts to wheel 12 and moves axially on shaft 122. Shaft 122 has pinion mounting portion 160 with keyway 162 for transmitting torque to the pinion 18. Shaft 122 further has counterwheel mounting portion 164 and splined portion 166. Splined portion 166 has portions 168, 172 that mate with internal spline 174 of hub 126 such that when hub 126 mates with portions 168, 172 there is little to no rotational play between hub 126 and shaft 122. Splined portion 166 further has portion 170 that mates with internal spline 174 of hub 126 such that when hub 126 mates with portion 170 there is a predetermined rotational play between hub 126 and shaft 122 where the external spline has been narrowed 176. Lead ins 178, 180 are provided to allow a smooth transition between the hub 126 and portions 168, 170, 172.

Figure 13:
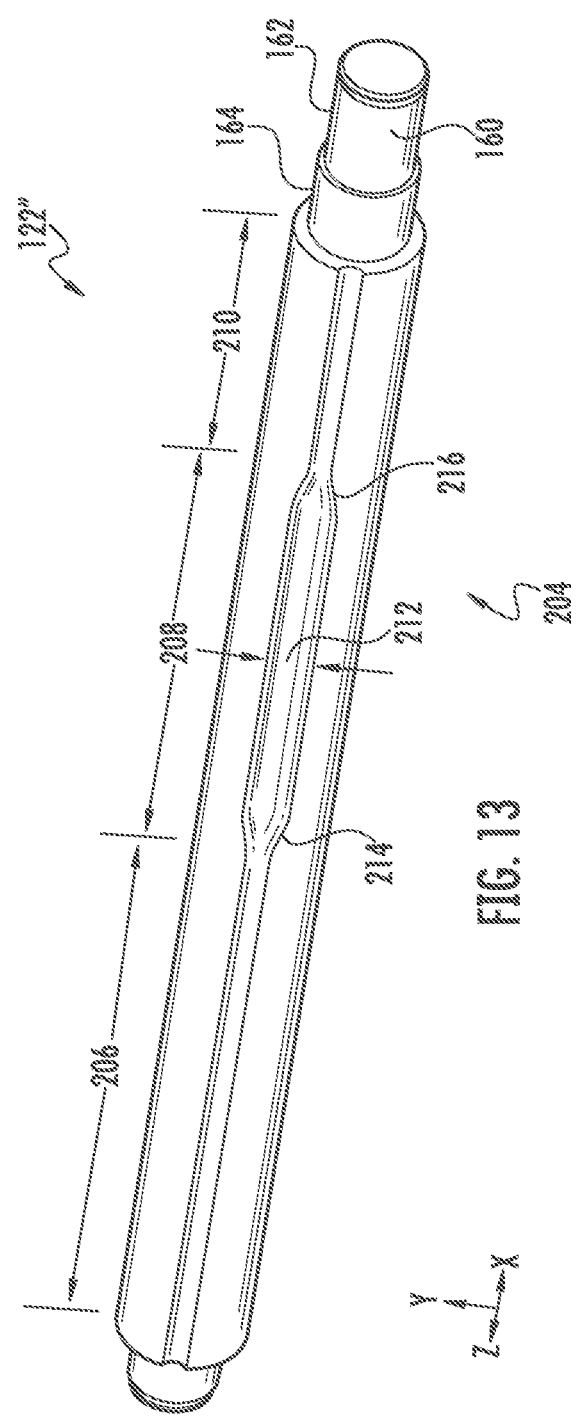
FIG. 13 is an isometric view of a shaft.
Figure 14:
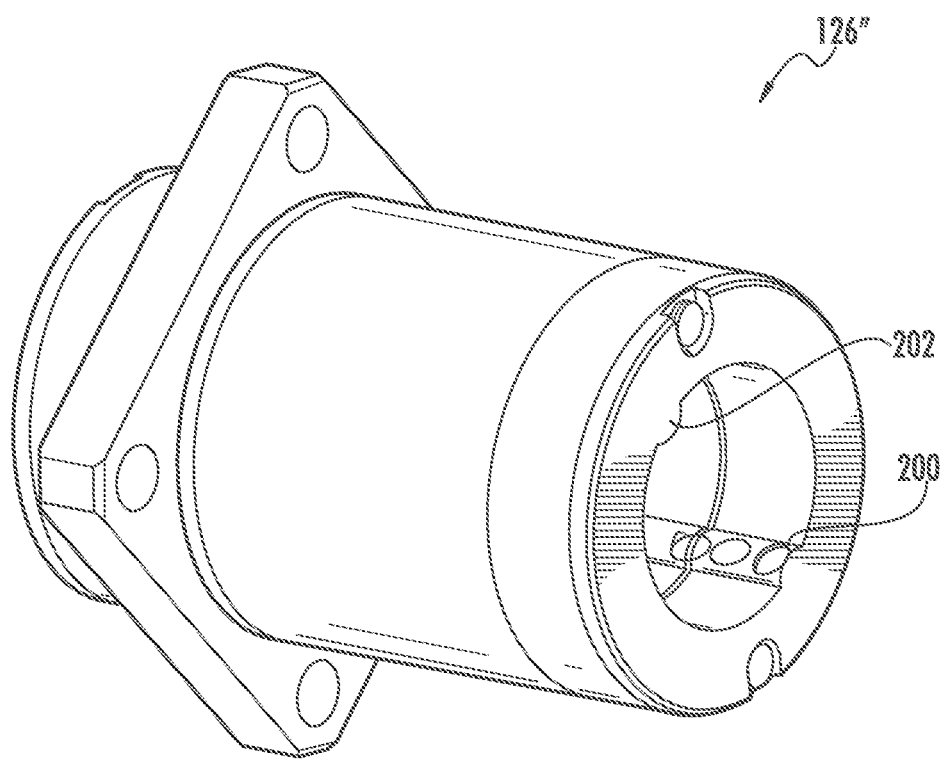
FIG. 14 is an isometric view of a hub.

Referring now to FIG. 13, there is shown an isometric view of an alternate embodiment shaft 122". Referring also to FIG. 14, there is shown an isometric view of an alternate embodiment ball spline hub 126". Ball spline hub 126" mounts to wheel 12 and moves axially on shaft 122". Ball spline hub 126" has recirculating balls 200, 202. Shaft 122" has pinion mounting portion 160 with keyway 162 for transmitting torque to the pinion 18. Shaft 122 further has counterwheel mounting portion 164 and grooved portion 204. Grooved portion 204 has race portions 206, 210 that mate with the recirculating balls 200, 202 of hub 126" such that when hub 126" mates with portions 206, 210 there is little to no rotational play between hub 126" and shaft 122".

Grooved portion 204 further has portion 208 that mates with the recirculating balls 200, 202 of hub 126" such that when hub 126" mates with portion 208 there is a predetermined rotational play between hub 126" and shaft 122" where the external race has been widened 212. Lead ins 214, 216 are provided to allow a smooth transition between the hub 126" and portions 206, 208, 210.

Figure 15:
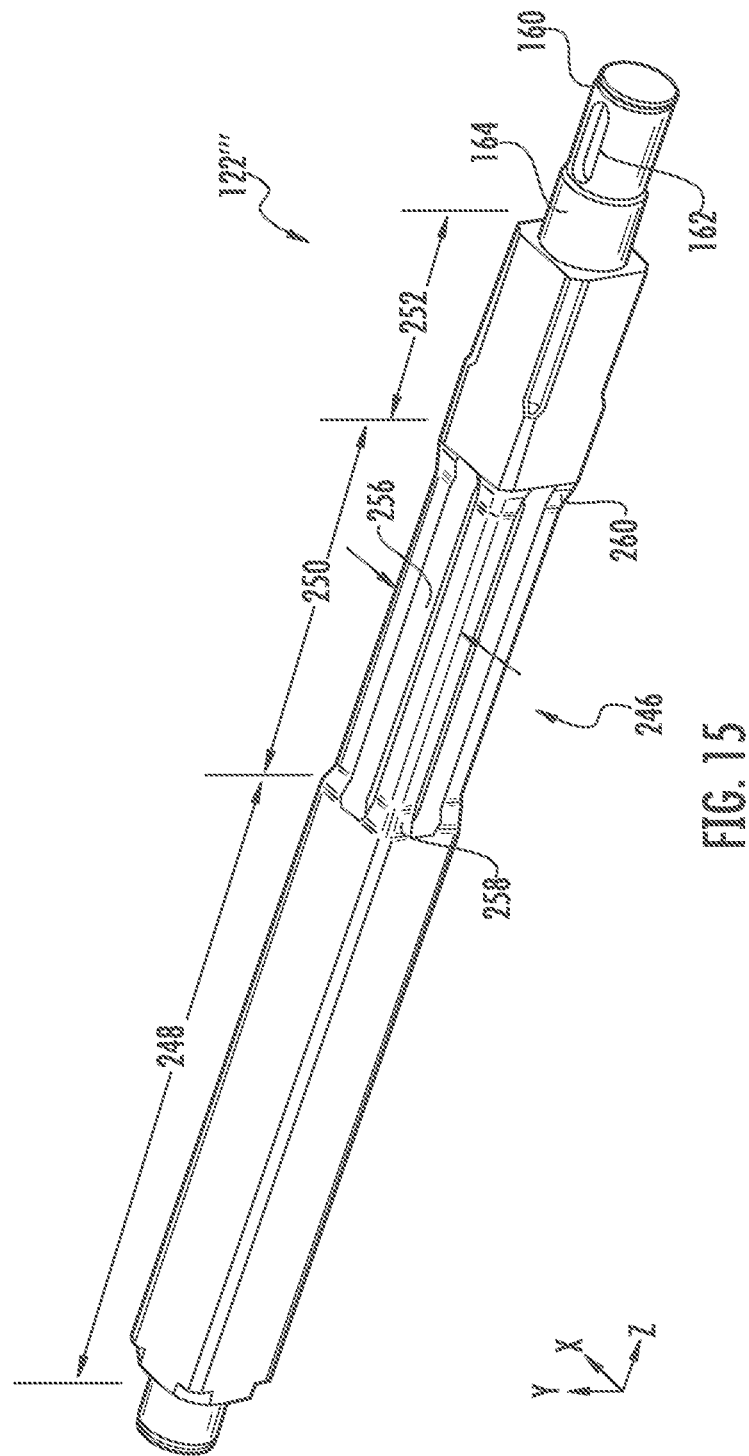
FIG. 15 is an isometric view of a shaft.
Figure 16:
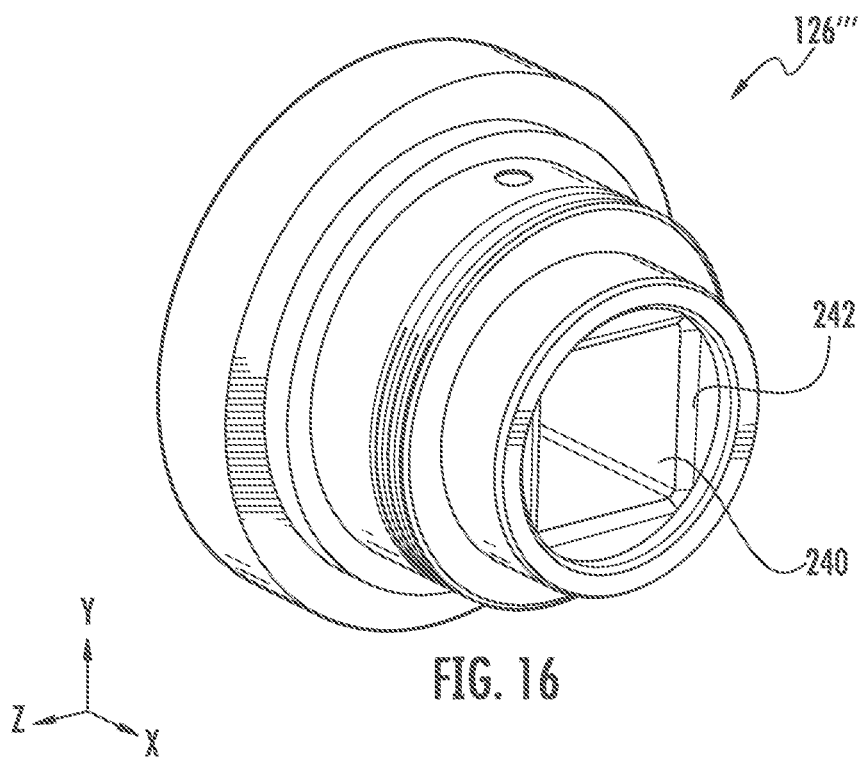
FIG. 16 is an isometric view of a hub.

Referring now to FIG. 15, there is shown an isometric view of an alternate embodiment shaft 122'''. Referring also to FIG. 16, there is shown an isometric view of an alternate embodiment square spline or hub 126'''. Square hub 126''' mounts to wheel 12 and moves axially on shaft 122'''. Square hub 126''' a mating square portion 240 with lead in chamfer 242. Shaft 122''' has pinion mounting portion 160 with keyway 162 for transmitting torque to the pinion 18. Shaft 122 further has counterwheel mounting portion 164 and spline or square portion 246. Square portion 246 has portions 248, 252 that mate with the mating square portion 240 of hub 126''' such that when hub 126''' mates with portions 248, 252 there is little to no rotational play between hub 126''' and shaft 122'''. Square portion 246 further has portion 250 that mates with mating square portion 240 of hub 126''' such that when hub 126''' mates with portion 250 there is a predetermined rotational play between hub 126''' and shaft 122''' where the external square portion 250 has been narrowed 256. Lead ins 258, 260 are provided to allow a smooth transition between the hub 126''' and portions 248, 250, 252.

Figure 17:
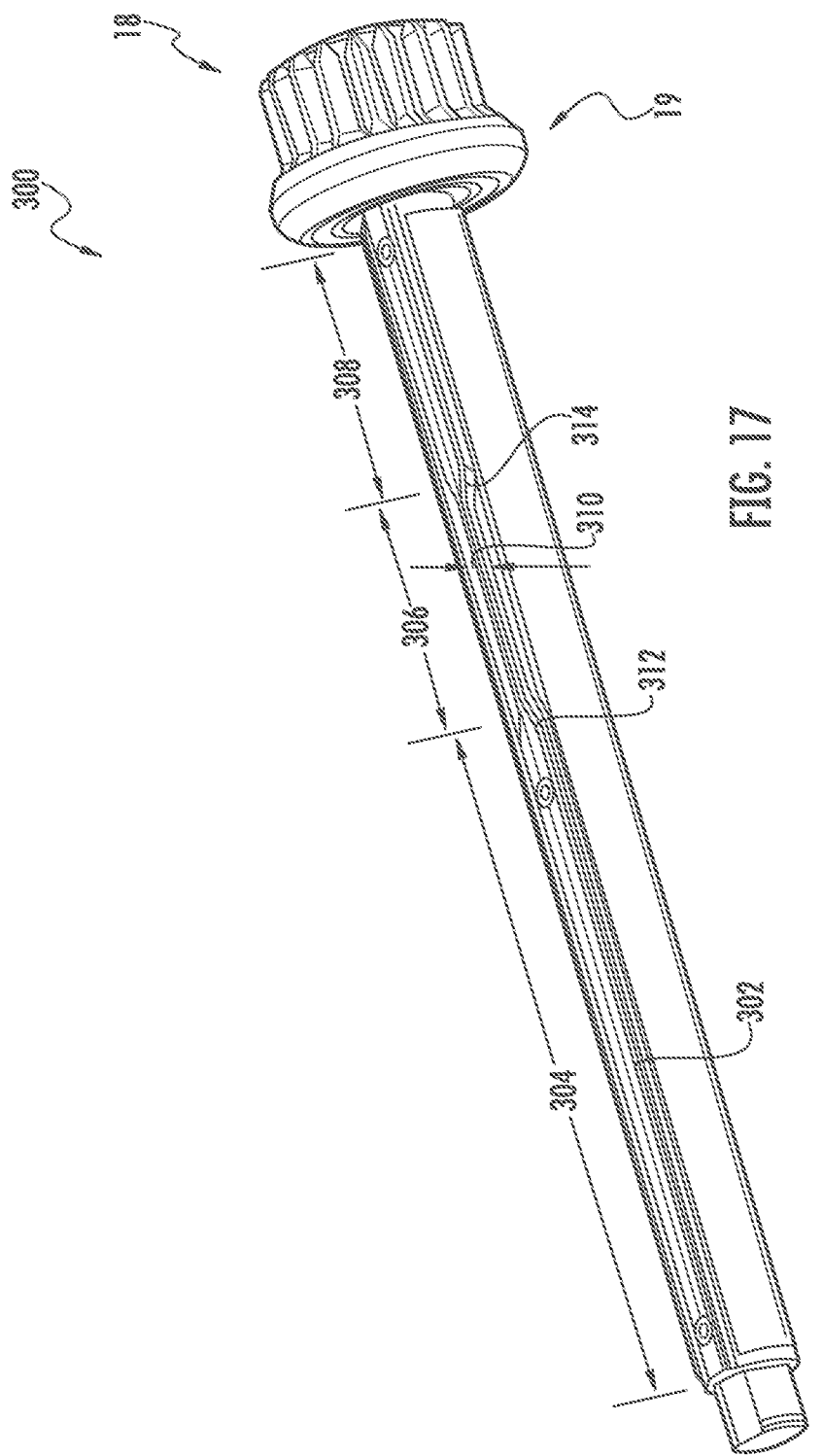
FIG. 17 is an isometric view of a shaft.
Figure 18:
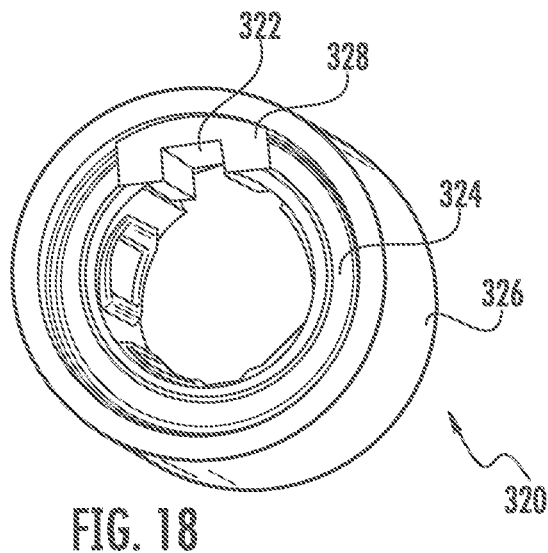
FIG. 18 is an isometric view of a hub.
Figure 19:
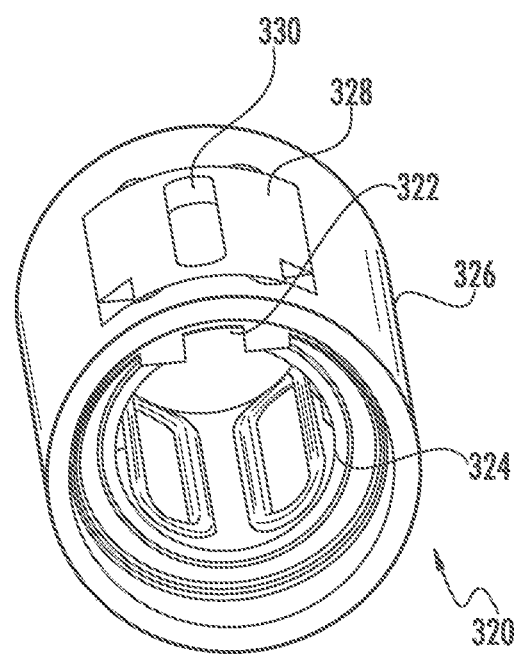
FIG. 19 is an isometric view of a hub.

Referring now to FIG. 17, there is shown an isometric view of an alternate embodiment shaft 300. Referring now to FIG. 18, there is shown an isometric view of an alternate embodiment hub 320. Shaft 300 is shown to mate with a hub 320 having a keyway 322. Shaft 300 is shown with pinion 18 and counterwheel 19. It is noted that the motor drive spline or bushing and wheel drive spline or bushing ride on the shaft and may have similar features as hub 320 (or hubs as described). Shaft 300 further has a key 302 with key portions 304, 308 that mate with the mating keyway of the keyed hub such that when the keyed hub mates with portions 304, 308 there is little to no rotational play between the hub and shaft 300. The key is modified to have a necked down region that is used to provide compliance where key 302 further has portion 306 that mates with the keyway of the hub 320 such that when the hub 320 mates with portion 306 there is a predetermined rotational play between the hub and shaft 300 where the external key 302 has been narrowed 310 at portion 306. Lead ins 312, 314 are provided to allow a smooth transition between the hub and portions 304, 306, 308. Hub 320 has linear bearing 324, housing 326 and insert 328 having key 322. Linear bearing or bushing 324 may be a sleeved or recirculating ball bushing and provides the extend and retract action of the bearing on the shaft. Housing 326 holds the linear bearing 324 and also holds the insert 328 that may be bronze, a polymer such as nylon or otherwise and having key way 322. Insert 328 transmits torque to the shaft key 302 and has secondary keyway 330 that transmits torque from the motor to the shaft or the shaft to the hub. Here, when the bronze insert in the motor or hub bushing travels over the necked down region of the key, compliance is introduced. This embodiment has similar behavior to the embodiment shown in FIG. 13 or otherwise but does not have rolling balls running over the compliant region.

Figure 20:
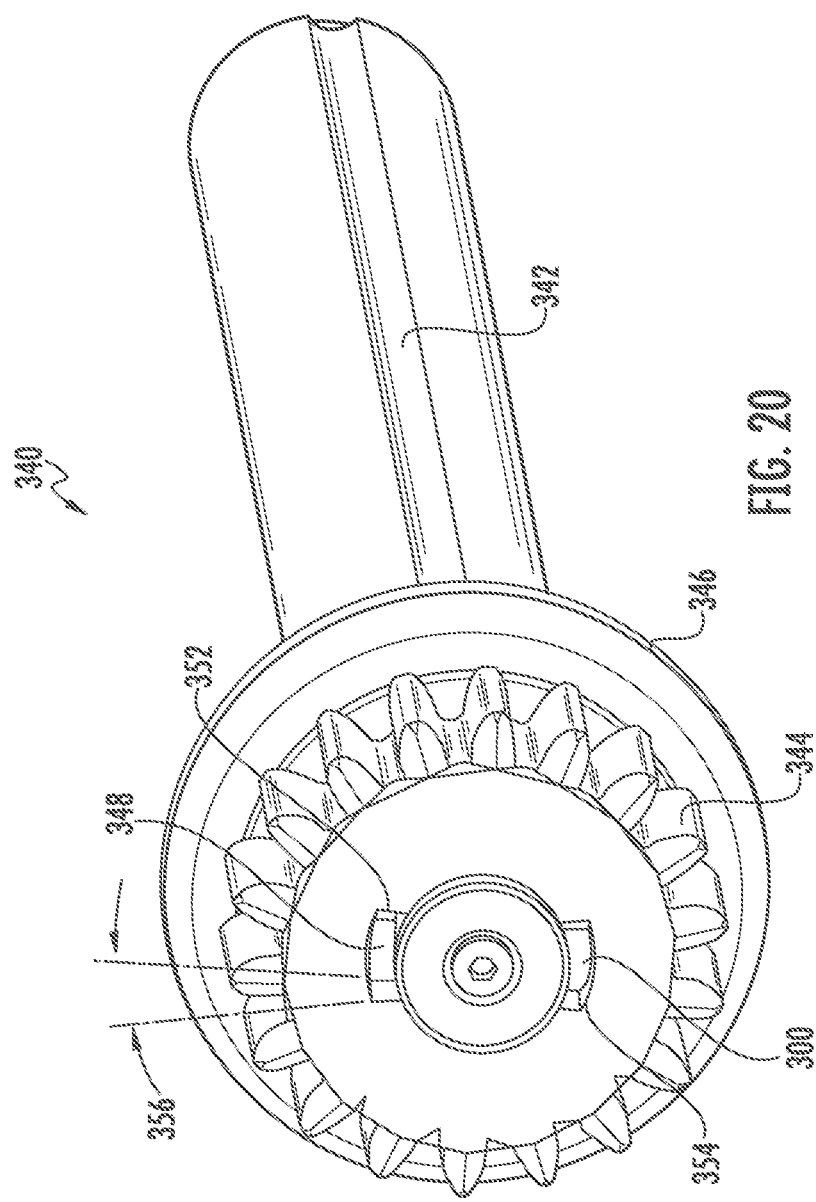
FIG. 20 is an isometric view of a shaft.
Figure 21:
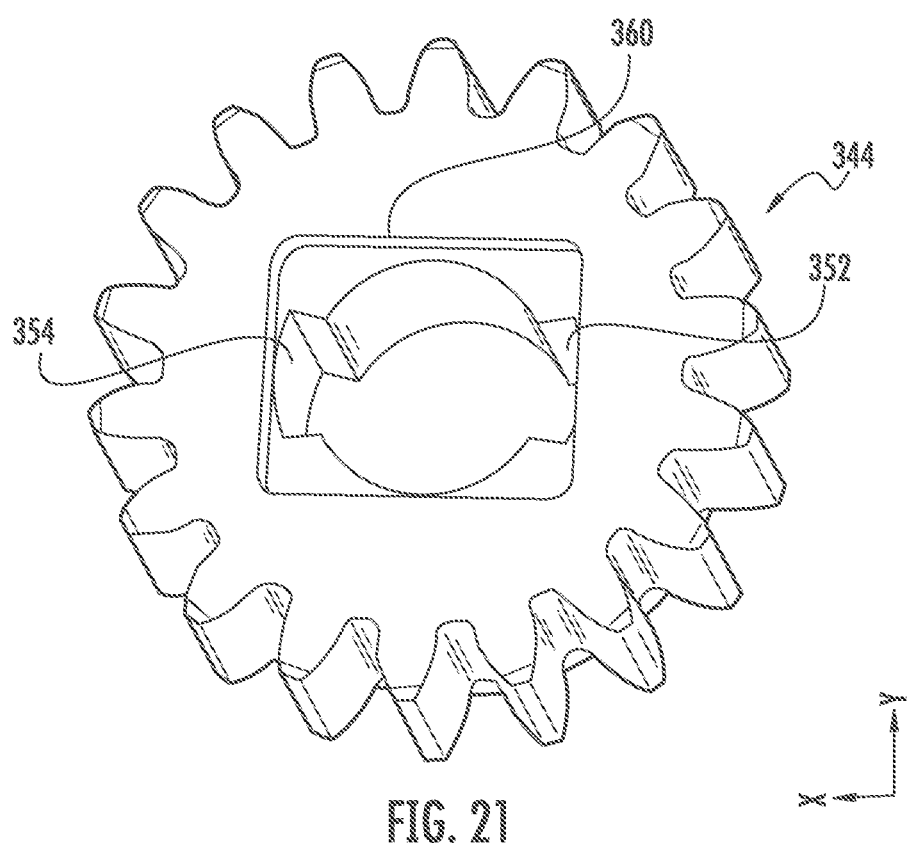
FIG. 21 is an isometric view of a pinion.
Figure 22:
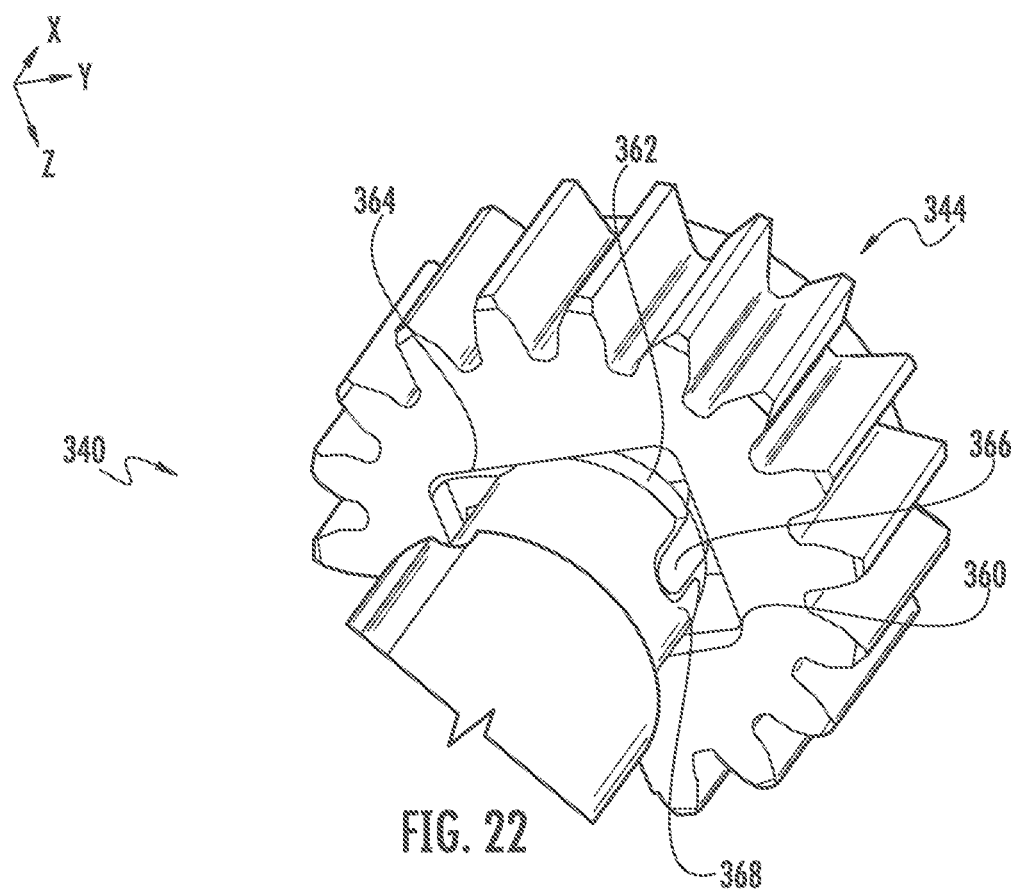
FIG. 22 is an isometric view of a shaft.

Referring now to FIG. 20, there is shown an isometric view of shaft 340. Shaft 340 has race grooves 342 configured to mate with a recirculating ball spline hub. Alternately, any suitable hub or spline may be used to transmit torque. Shaft 340 further has pinion 344 and counterwheel 346. Shaft 340 further has opposing keys 348, 350 that mate with keyways 352, 354 of pinion 344 respectively. Keyways 352, 354 are cut with additional clearance 356 to introduce a predetermined amount of play between the shaft and the pinion. Features are provided to keep the key centered in the keyway when torque is not being transmitted. Pinion 344 has a recessed rectangular region 360 that accepts a torsional spring 362. Spring 362 has legs 364 on opposing sides of the shaft that engage the walls of recess 360 in pinion 344. Torsional spring 362 further has a tongue 366 that engages a slot 368 in the shaft. Torque is transmitted through the shaft to the tongue via the slot and to the pinion via the compliant legs 364 of the torsional spring 362 such that compliance is introduced between the shaft and the pinion until the key 348 engages keyway 352.

FIGS. 23-30, and the accompanying description, provide an overview of an automated retrieval and storage system in which the compliant pinion robot 10 may be used. FIGS. 23, 24, 25, 26A, 26B-C, 27A-G, 28A-K, 29 and 30 correspond directly to FIGS. 15, 16A, 17, 54G, 54A-B, 60A-G, 52A-K, 55 and 40A of US Patent Publication Number US 2017/0313514 A1 dated Nov. 2, 2017 and entitled "Order Fulfillment System," which publication has been incorporated by reference herein and in the parent provisional patent application in its entirety. The following description of FIGS. 23, 24, 25, 26A, 26B-C, 27A-G, 28A-K, 29 and 30 correspond directly to at least portions of the description of FIGS. 15, 16A, 17, 54G, 54A-B, 60A-G, 52A-K, 55 and 40A of US Patent Publication Number US 2017/0313514 A1.

Figure 23:
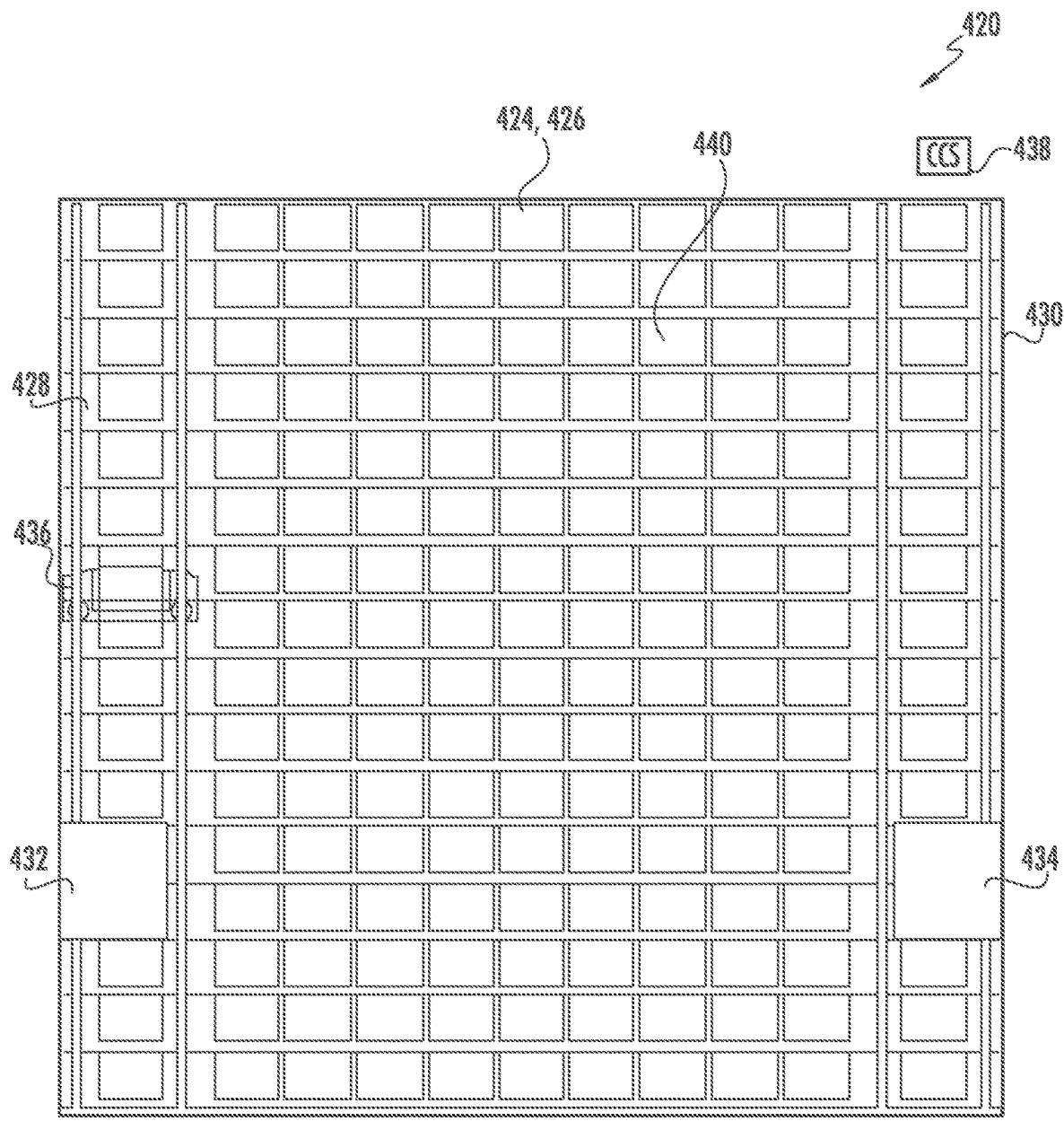
FIG. 23 is a side view of an example order fulfillment system in accordance with aspects of the disclosed embodiment.
Figure 24:
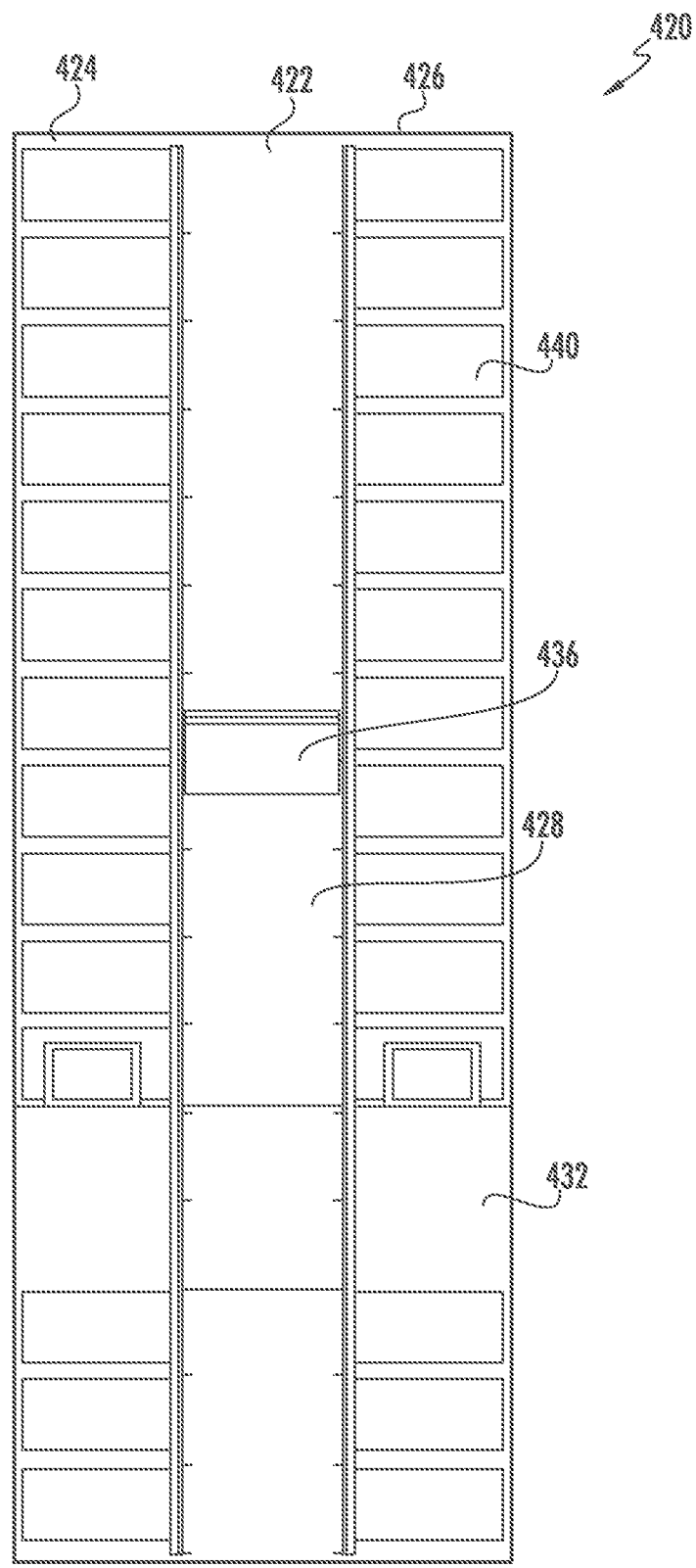
FIG. 24 is a front view of an example order fulfillment system in accordance with aspects of the disclosed embodiment.
Figure 25:
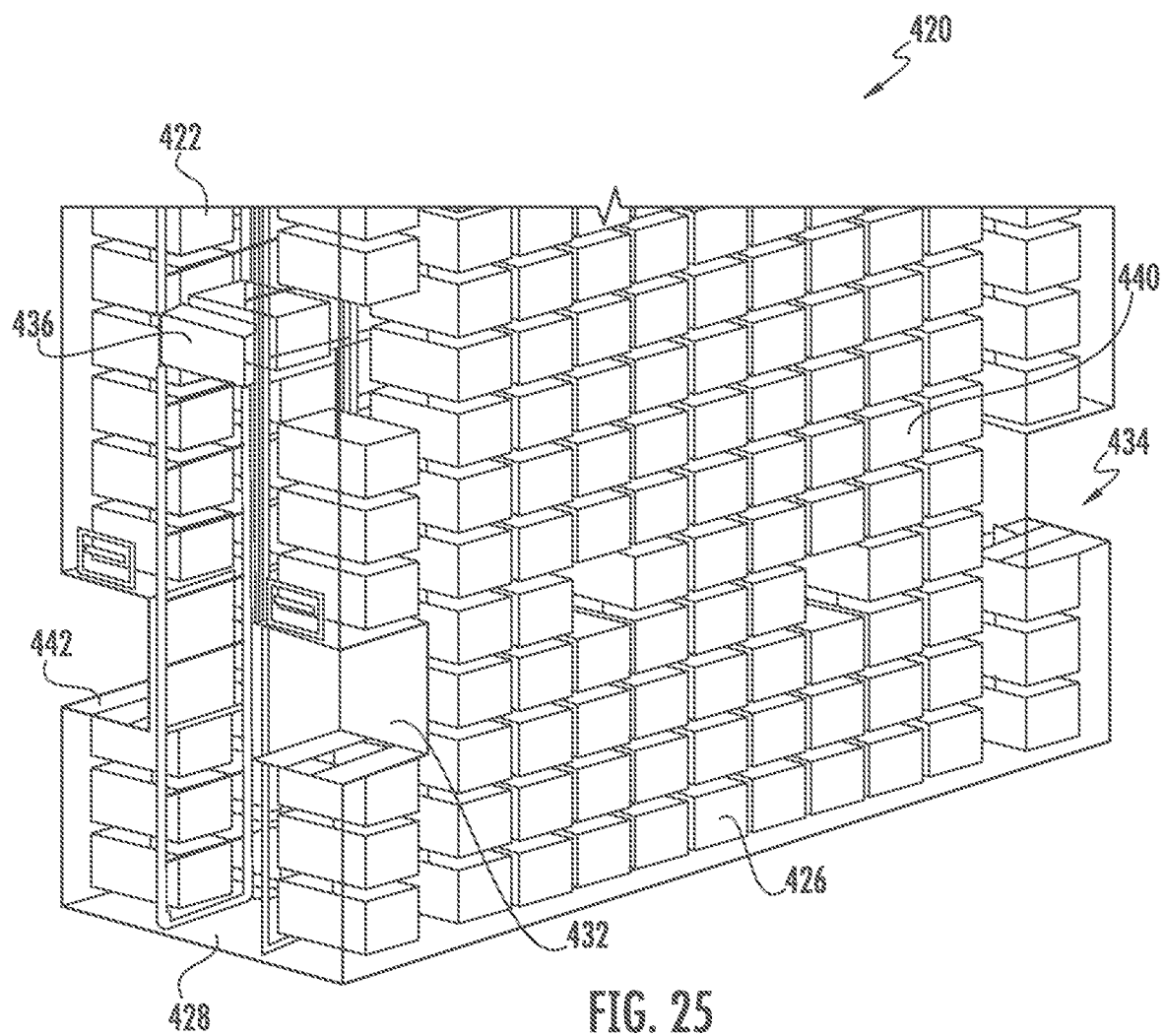
FIG. 25 is a partial isometric view of an example order fulfillment system in accordance with aspects of the disclosed embodiment.

Referring now to FIGS. 23-25, there are shown side, front and top views respectively of example order fulfillment system configured in a vending configuration. Here, the order fulfillment system may be described as an order vending machine 420 or "OVM" or otherwise. The order vending machine 420 shows an alternate, for example, scaled down version of the robotic vehicle and rack system, for example, that may be utilized in store vending of delivered goods or any other suitable application. For example, the vehicle technology may be used in e-commerce as applied to the "last-mile" delivery problem. For example, "Pure-play" e-commerce companies have little choice but to deliver the vast majority of orders to customers' homes, which may be costly. Retailers who both operate self-service stores and sell online can offer customers the choice of picking orders up at store locations, commonly called "click-and-collect", but in practice this model places an additional and unpredictable workload on store personnel that may result in extended wait times by customers, etc. Here, the order vending machine 420 provides an automated solution that requires a very little floor space (or land) but can securely hold a large number of orders, and also provides convenient on-demand access and short transaction times to customers. Here, the order vending machine 420 may be a robotic vehicle based "micro-warehouse" that may be referred to as an Order Vending Machine (OVM) that operates in conjunction with an e-commerce fulfillment center, for example one equipped with a robotic vehicle based system. In one aspect, Order-Totes ("O-Totes") containing customer orders may be delivered to and stored within the OVM, and then presented on demand to customers, with robotic vehicles performing all required Tote-storage and retrieval functions.

Figure 26A:
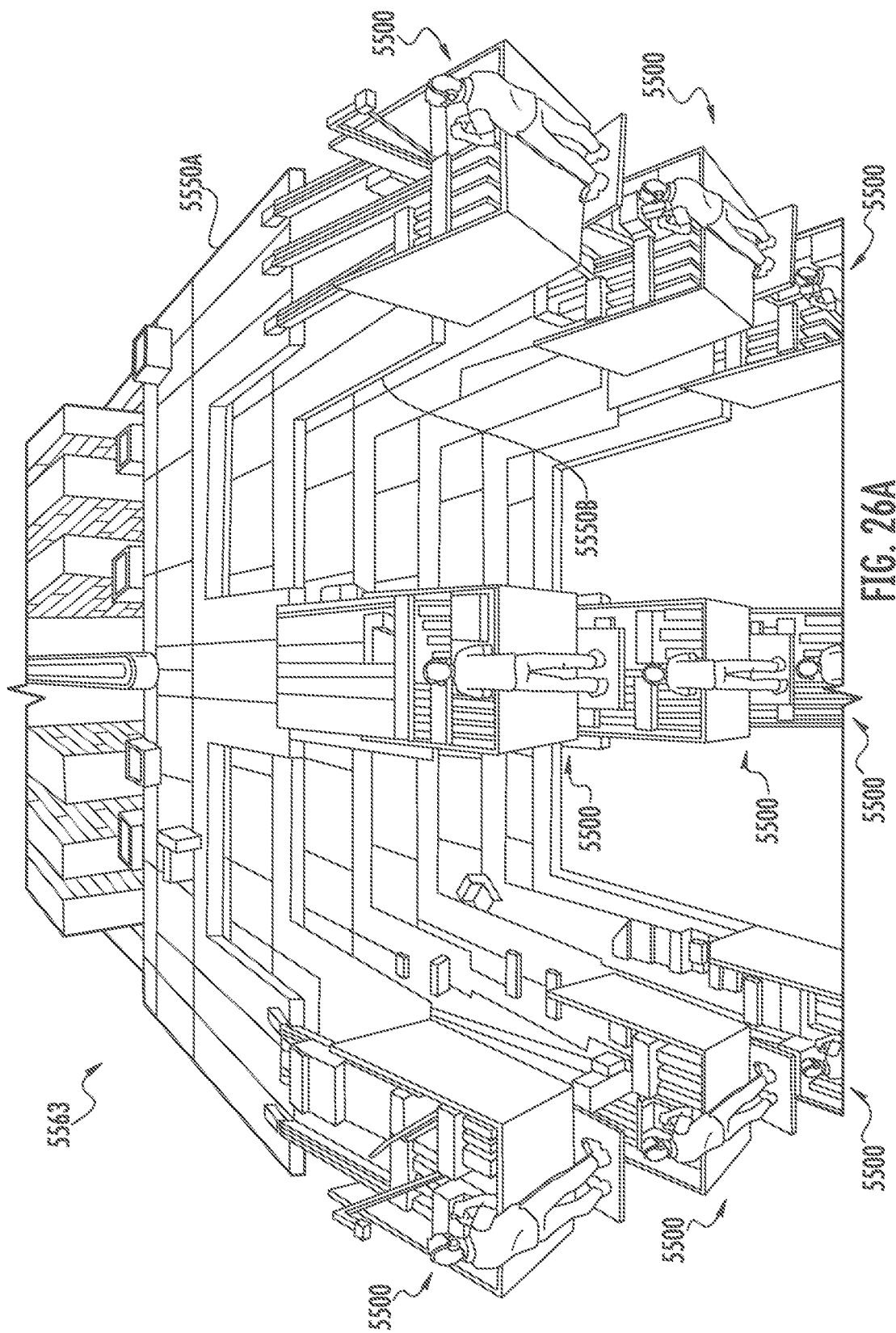
FIG. 26A is a schematic illustration of a portion of storage structure in accordance with aspects of the disclosed embodiment.
Figure 26B:
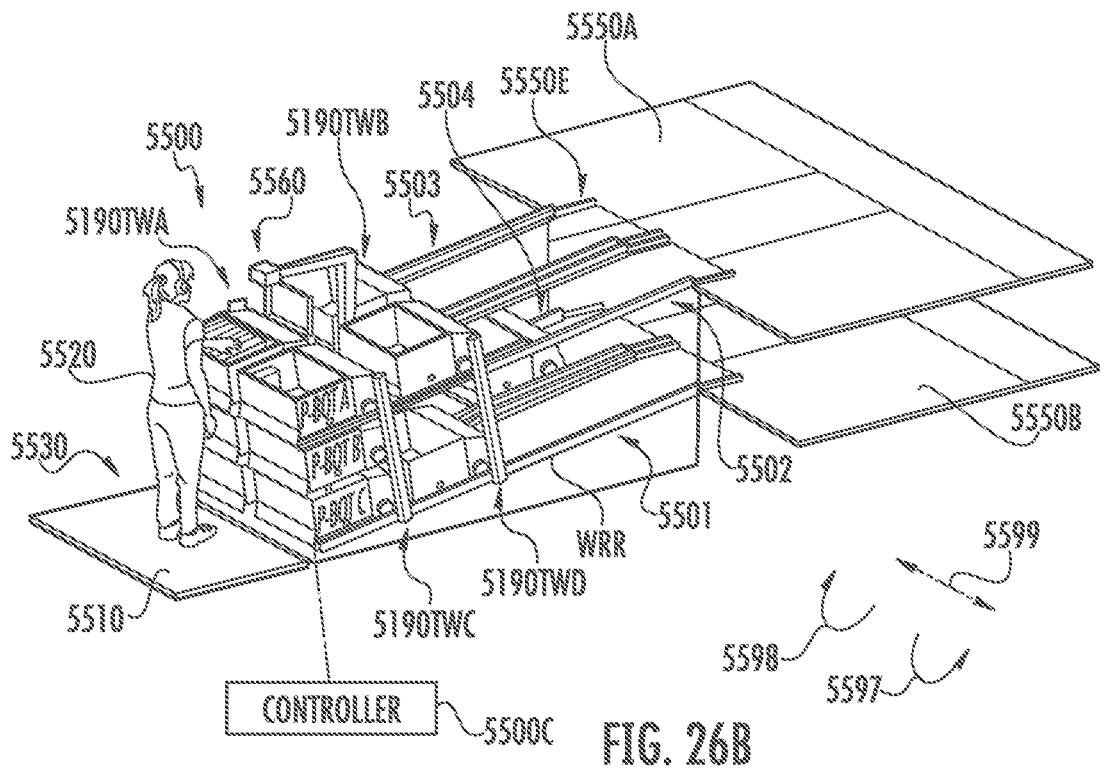
FIGS. 26B-C are isometric views of a workstation in accordance with aspects of the disclosed embodiment.
Figure 26C:
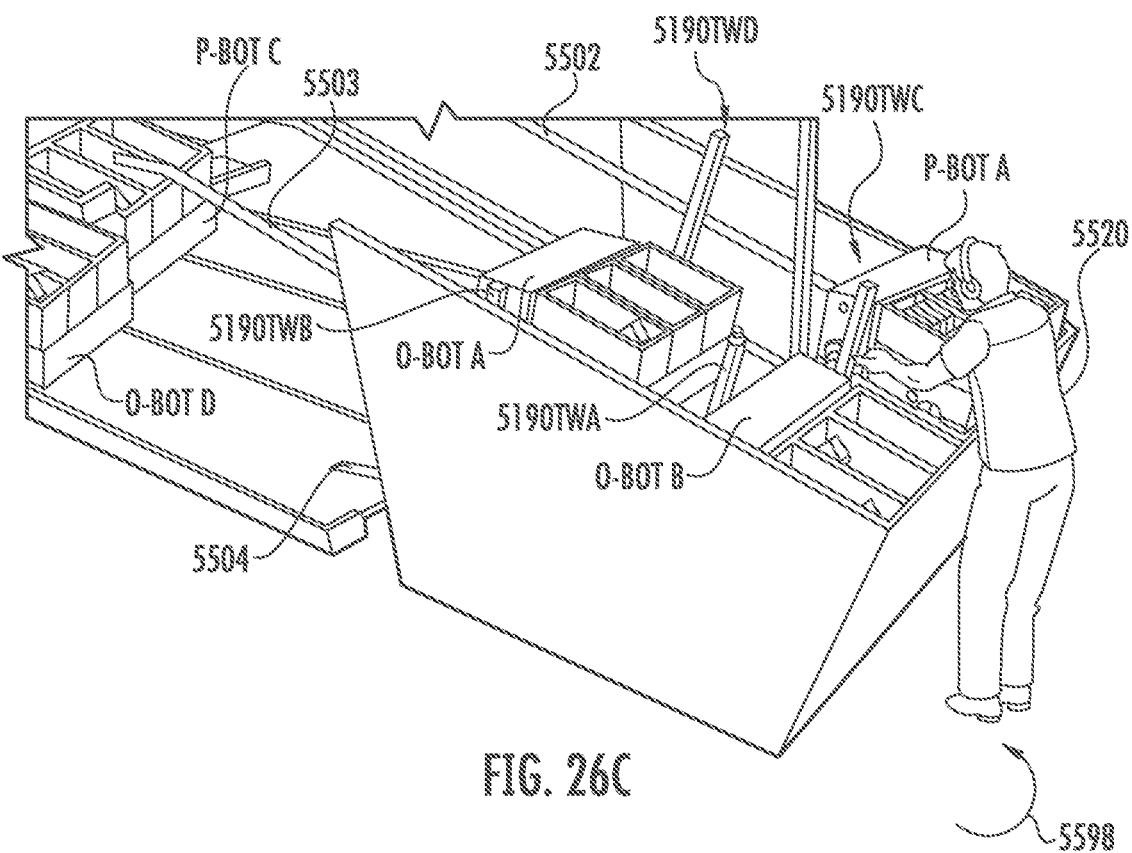

Referring now to FIGS. 26A, 26B and 26C, an order fulfillment workstation 5500 is shown. While one workstation 5500 is shown in FIGS. 26A and 26C, it should be understood that the storage and structure 5563 (which is substantially similar to the storage structures described herein) may have any suitable number of workstations 5500. For example, FIG. 26A illustrates an exemplary configuration of workstations 5500 where at least three workstations 5500 are disposed on each storage level, while in other aspects any suitable number of workstations may be disposed on each storage level. The workstations 5500 for the different levels may be vertically offset from one another such as being stacked one above the other or stacked in a staggered arrangement. In one aspect, each workstation 5500 is communicably connected to two transit decks 5550A, 5550B, while in other aspects each workstation 5500 may be communicably connected to any suitable number of transit decks. In one aspect, each transit deck 5550A, 5550B may correspond to a respective storage level while in other aspects the transit decks 5550A, 5550B may correspond to a common storage level (e.g. there is more than one transit deck associated with each storage/picking level). In another aspect, there may be towers (substantially similar to elevation tracks 5190) that are located on or otherwise connected to (or disposed within) the transit decks (or aisles) that communicably connect one or more of the transit decks 5550A, 5550B (or aisles) of the different storage levels to from a travel loop with another tower so that bots 5100 may travers between the stacked transit decks 5550A, 5550B (or aisles) to any desired/predetermined level of the storage structure. The workstations 5500 are configured to accommodate a picker 5520 that transports one or more eaches from a tote (e.g. a P-tote) on one of the bots 5100 to a "put" location in a tote (e.g. an O-tote) on another one of the bots 5100. The workstations 5500 may be arrayed at multiple elevations where human or robotic pickers remove eaches from product Totes (P-totes) and place them into either order Totes (O-totes) or a mobile robot, depending on the system configuration and in a manner substantially similar to that described above. In one aspect, the workstation 5500 includes conveyance lanes or aisles 5501, 5502, 5503, 5504, elevation towers 5190T and a picker platform 5510 disposed at a pick station 5530. A workstation 5500 is disposed at each transit deck level so that bots 5100 on each transit deck have access to a workstation 5500. In the exemplary aspect illustrated in FIG. 26B two transit deck levels 5550A, 5550B are shown connected to a common workstation 5500 however, in other aspects any suitable number of transit deck levels may be connected to a common workstation 5500.

Each of the conveyance lanes 5501, 5502, 5503, 5504 has a respective entry and/or exit 5500E in communication with a respective transit deck 5550A, 5550B. As can be seen in FIG. 26B conveyance lanes 5501, 5504 have entry/exits 5500E in communication with transit deck 5550B while conveyance lanes 5502, 5503 have entry/exits 5500E in communication with transit deck 5550A. The conveyance lanes 5501-5504 include rails WRR that are substantially similar to rails HRR described above with respect to the aisles providing access to the tote storage/holding locations. As can also be seen in FIG. 26B elevation towers 5190TWA-5190TWD connect stacks of conveyance lanes to each other in a manner substantially similar to that described above with respect to elevation towers 5190T. The elevation towers 5190TWA-5190TWD are substantially similar to the elevation towers 5190T described above. As an example, elevation towers 5190TWA, 5190TWB connect conveyance lanes 5503, 5504 so that bots 5100 can traverse between the conveyance lanes 5503, 5504. Elevation towers 5190TWC, 5190TWD connect conveyance lanes 5501, 5502 so that bots 5100 can traverse between the conveyance lanes 5501, 5502.

In one aspect, one or more of the conveyance lanes 5501-5504 and towers 5190TWA-5190TWD may be angled (e.g. tilted or raked) relative to the transit decks 5550A, 5550B and the operator platform 5510 so that when the P-totes and O-totes are presented to the picker 5520 by the respective P-bot and O-bot, the P-totes and O-totes are angled so that the picker 5520 can view and access the P-totes and O-totes for picking and placing eaches from pick/place positions defined by the towers 5190TWA, 5190TWC adjacent the pick station 5530. In other aspects, the conveyance lanes 5501-5504 and towers 5190TWA-5190TWD may have any spatial relationship with the pick station 5530 and/or transit decks 5550A, 5550B for presenting the totes to the picker 5520 in any suitable spatial orientation.

In one aspect, the conveyance lanes 5501-5504, the elevation towers 5190TWA-5190TWD and the pick station 5530 have a symmetric structure with independent product bots (P-bots) and order bots (O-bots) paths and positions. In this aspect there may be lateral symmetry (in direction 5599) so that there is a left/right symmetrical arrangement. For example, the left/right symmetrical arrangement may be such that P-bots carrying P-totes are arranged on the right side of the workstation 5500 while O-bots carrying O-totes are arranged on the left side of the workstation 5500. In other aspects, the P-bots and P-totes may be on the left side of the workstation 5500 while the O-bots and O-totes are on the right side of the workstation 5500.

In one aspect, there are dedicated bot flow entry and exit conveyance lanes for both the P-bots and O-bots. For example, the flow of bots to the pick station 5530 may be such that the bots travel from lower conveyance lanes to upper conveyance or in other aspects, from upper conveyance lanes to lower conveyance lanes. For example, where bots travel from lower conveyance lanes to upper conveyance lanes, P-bots carrying eaches to be picked enter one or more lower/bottom conveyance lane(s) 5501, traverse tower 5190TWC to one or more upper conveyance lane(s) 5502 so that the each(es) can be picked where the P-bot exits the workstation using the one or more upper conveyance lane(s) 5502. Similarly, e.g., O-bots carrying O-totes to which eaches are to be placed enter one or more lower/bottom conveyance lane 5504, traverse tower 5190TWA to one or more upper conveyance lane(s) 5503 so that the each(es) can be placed where the O-bot exits the workstation using the one or more upper conveyance lane(s) 5503. In other aspects, the entrance of bots to the workstation may be timed such that the bots can enter and exit from both the upper conveyance lanes 5502, 5503 and the lower conveyance lanes 5501, 5504 where the towers 5190TWA-5190TWD are employed to route bots past one another such as when bots are entering and exiting a common conveyance lane 5501-5504. In the examples, described above, the flow of P-bots carrying P-totes and the flow of O-bots carrying O-totes are both generally in a common direction, such as both in the direction of arrow 5598 from lower conveyance lanes to upper conveyance lanes or both in the direction of arrow 5597 from upper conveyance lanes to lower conveyance lanes. However, in other aspects, the flow of one or more of the P-bots and O-bots may be in the direction of arrow 5597 from upper conveyance lanes to lower conveyance lanes. For example, the flow of P-bots and P-totes may be in the direction 5598 while the flow of O-bots and O-totes may be in the direction 5597 or vice versa.

In one aspect, each side of the workstation 5500 (e.g. the product side and the order side) has dedicated flow direction elevation towers. For example, elevation tower 5190TWC on the product side of the workstation 5500 may be dedicated to the upward flow of bots while elevation tower 5190TWD on the product side of the workstation 5500 may be dedicated to the downward flow of bots or vice versa. Similarly, elevation tower 5190TWA on the order side of the workstation 5500 may be dedicated to the upward flow of bots while elevation tower 5190TWB on the order side of the workstation 5500 may be dedicated to the downward flow of bots or vice versa. The dedicated flow of bots for each tower 5190TWA-5190TWD on the respective order or product side of the workstation 5500 generates, for example, an elevation flow loop in one or more of directions 5597, 5598 between the levels of conveyance lanes 5501-5504 on the respective order and product sides of the workstation 5500 in a manner substantially similar to that described above. As noted above, while only two conveyance lanes are shown stacked one above the other on each side of the workstation, in other aspects each side of the workstation may have any suitable number of conveyance lanes stacked one above the other, such as more or less than two conveyance lanes. Where more than two conveyance lanes are provided, stacked one above the other, on the product side and/or the order side of the workstation 5500 the towers 5190TWA-5190TWD may have intermediate entrance and exits that allow bots to enter/exit the towers from the intermediate conveyance lanes IL disposed between the uppermost and lowermost conveyance lanes 5502, 5501 of the stack of conveyance lanes.

As described above, the towers 5190TWA, 5190TWC adjacent the pick station 5530 define the pick/place positions of the bots (e.g. the P-totes and O-totes). For example, the pick positions may be defined by the towers 5190TWA, 5190TWC so as to be substantially at the top of the towers 5190TWA, 5190TWC at a position along the tower that allows the bots to transition between the towers 5190TWA, 5190TWC and the respective uppermost conveyance lane 5502, 5503. As also described above, the towers 5190TWA, 5190TWC may be angled relative to the pick station 5530 for presenting the P-totes and O-totes to the picker 5520 in any suitable spatial orientation. In one aspect, the other towers 5190TWB, 5190TWD (e.g. disposed along the conveyance lanes 5501-5504 on an opposite side of the towers 5190TWA, 5190TWC, that define the pick/place positions, from the picker 5520) that form the elevation loop with a respective one of the towers 5190TWA, 5190TWC may be angled at the same angle as the towers 5190TWA, 5190TWC or angled at any suitable different angle relative to the pick station 5530. In one aspect, the towers 5190TWB, 5190TWD may be substantially upright (e.g. vertical). In one aspect, as described above, the conveyance lanes 5501-5504 may also be angled with respect to the pick station so as to form ramps between the transit decks 5550A, 5550B (and/or intermediate decks IL) and the operator platform 5510 where the ramps allow for substantially orthogonal alignment between one or more of the towers 5190TWA-5190TWD and the respective conveyance lanes 5501-5504 to facilitate ease of constraints and repeat engagement for bot 5100 transitions from the towers 5190TWA-5190TWD to the conveyance lanes 5501-5504 and vice versa. In one aspect the tower rake/angle establishes or defines the ramp pitch.

In one aspect, the workstation 5500 includes any suitable Machine-Vision Subsystem ("MVS") 5560 which may be substantially similar to that described above. For example, the MVS 5560 may include any suitable visual indicators (e.g. such as displays and/or light sources), any suitable aural indicators, any suitable motion sensors/cameras, any suitable beam sensors/light curtains (e.g. break the beam/curtain sensors), glove tracking systems or any other suitable devices for indicating a pick location, indicating a place location, indicating a quantity to be picked/placed, tracking the motion of the picker's 5520 hands, verifying a pick and/or verifying a place. In one aspect, a controller 5500C is provided for controlling the aspects of the workstation 5500 described herein where the controller 5500C is resident at the workstation 5500, a central control system CCS (such as described above), a bot 5100 controller or a combination thereof. The controller 5500C communicates with the machine vision system 5560 to effect the picking and placing of eaches as described herein.

In one aspect, the controller 5500C is configured to identify and validate an effective pick where the controller 5500C issues a confirmation to a P-bot that a pick has been effected from the P-bot. The P-bot is configured (e.g. the P-bot controller is programmed) such that when the P-bot receives the pick confirmation issued from the controller 5500C, the P-bot automatically moves from the pick station 5530. In one aspect, the P-bot controller may be programmed such that upon receiving the pick confirmation the P-bot traverses to an exit of a respective conveyance lane 5502 or in other aspects, the P-bot enters into a tower, such as tower 5190TWD, to return back to the entry conveyance lane 5501 for re-entry into the pick queue.

In one aspect, the controller 5500C is configured to identify and validate an effective place where the controller 5500C issues a confirmation to an O-bot that a place has been effected to the O-bot. The O-bot is configured (e.g. the O-bot controller is programmed) such that when the O-bot receives the place confirmation issued from the controller 5500C, the O-bot automatically moves from the pick station 5530. In one aspect, the O-bot controller may be programmed such that upon receiving the place confirmation the O-bot traverses to an exit of a respective conveyance lane 5503 or in other aspects, the O-bot enters into a tower, such as tower 5190TWB, to return back to the entry conveyance lane 5504 for re-entry into the place queue. In one aspect, the O-bot may re-enter into the place queue until the controller 5500C issued an order complete command to the O-bot at which time the O-bot exits the pick station 5530 to the transit deck(s).

FIGS. 27A, 27B, 27C, 27D, 27E, 27F, and 27G represent a step-wise progression of the vehicle transitioning from horizontal movement to vertical movement, in accordance with aspects of the disclosed embodiment. Specifically, the vehicle in the form of the bot 5100 is shown, which as indicated elsewhere herein may be substantially similar to the bots described throughout this disclosure unless otherwise noted.

Figure 27A:
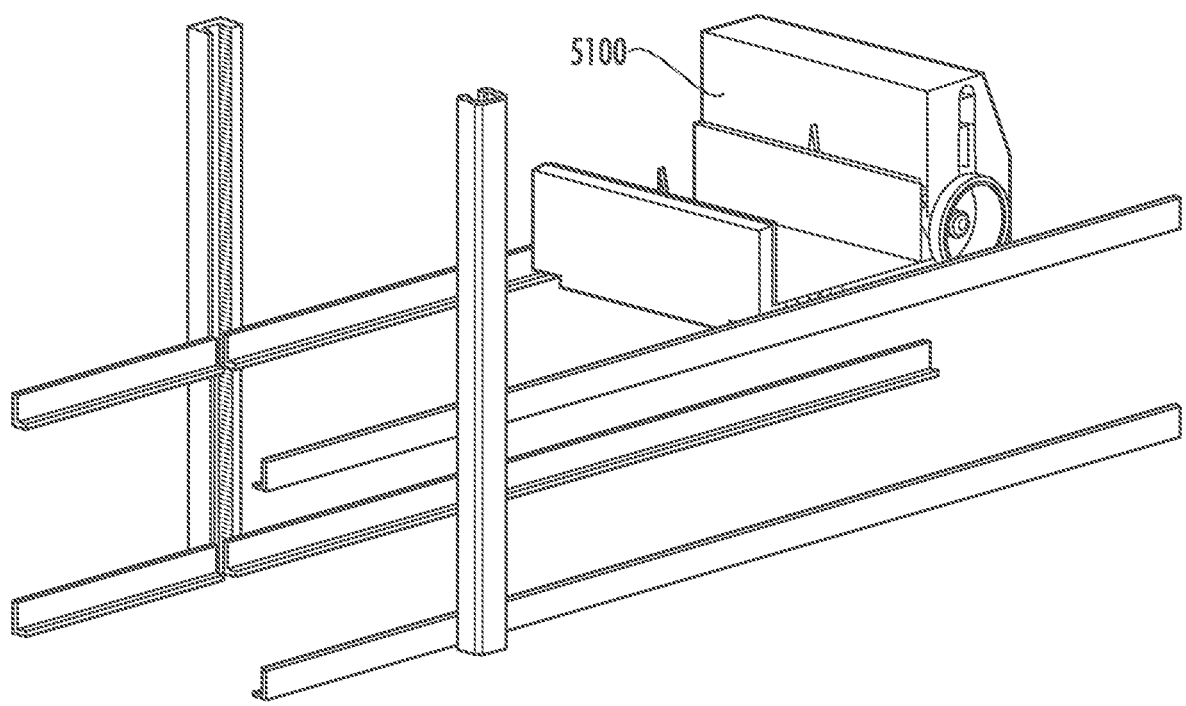
FIGS. 27A, 27B, 27C, 27D, 27E, 27F and 27G represent a step-wise progression of the vehicle transitioning from horizontal movement to vertical movement, in accordance with aspects of the disclosed embodiment.
Figure 27B:
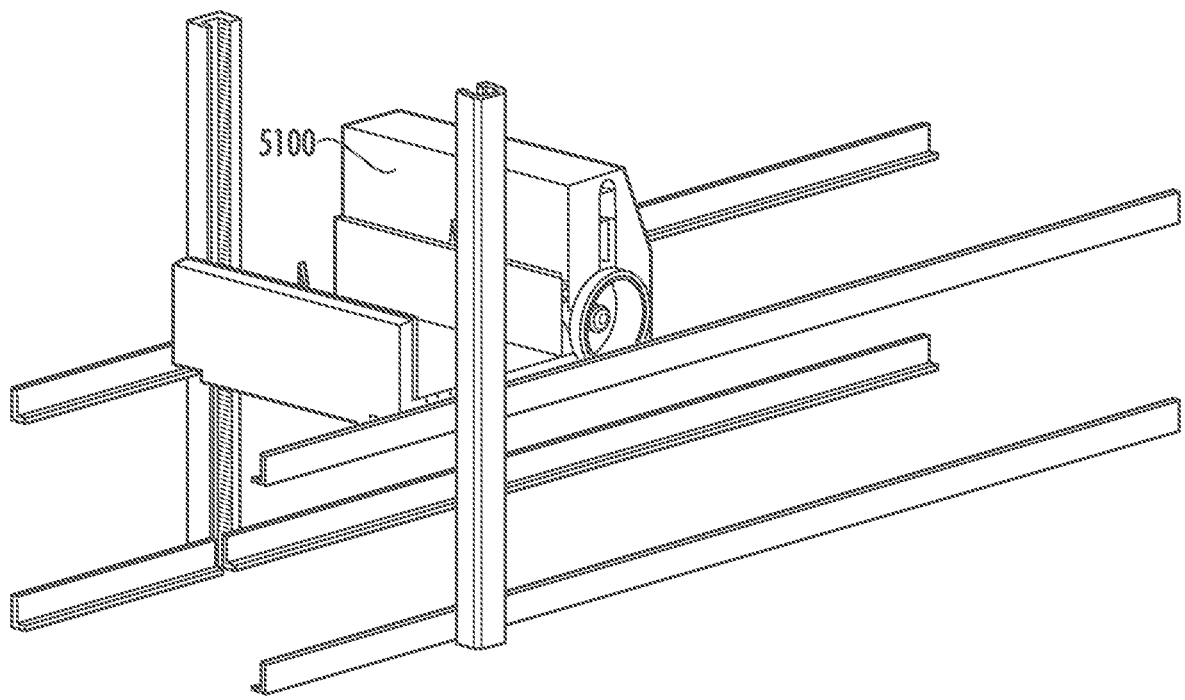
Figure 27C:
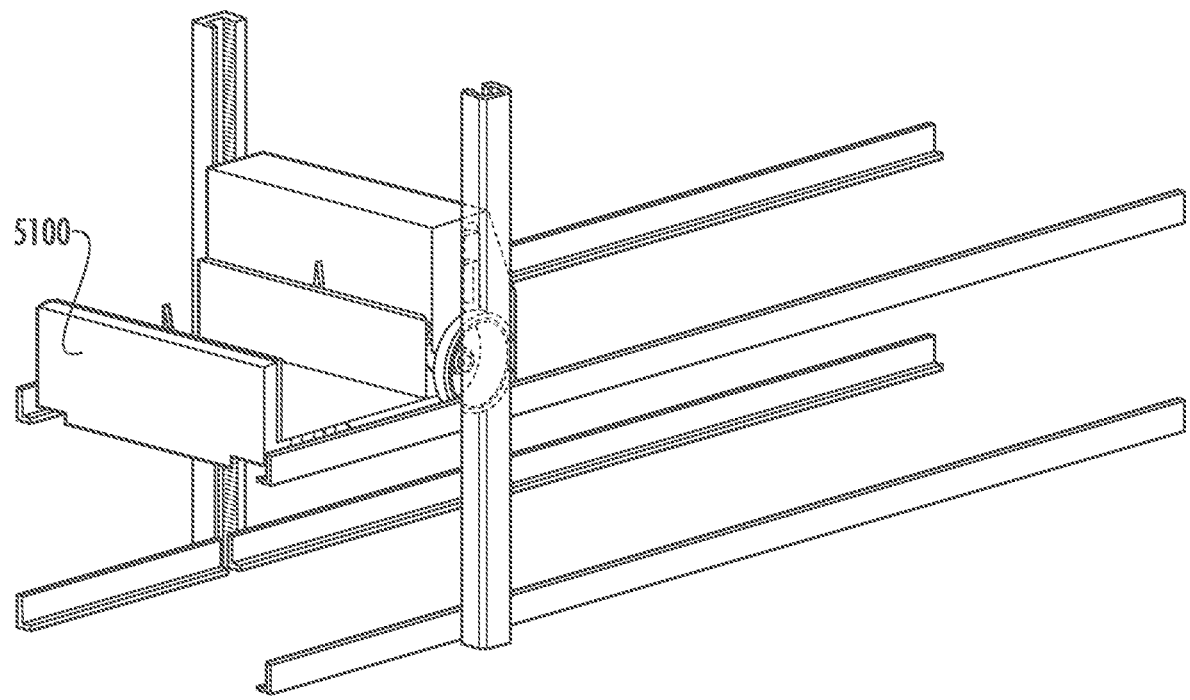
Figure 27D:
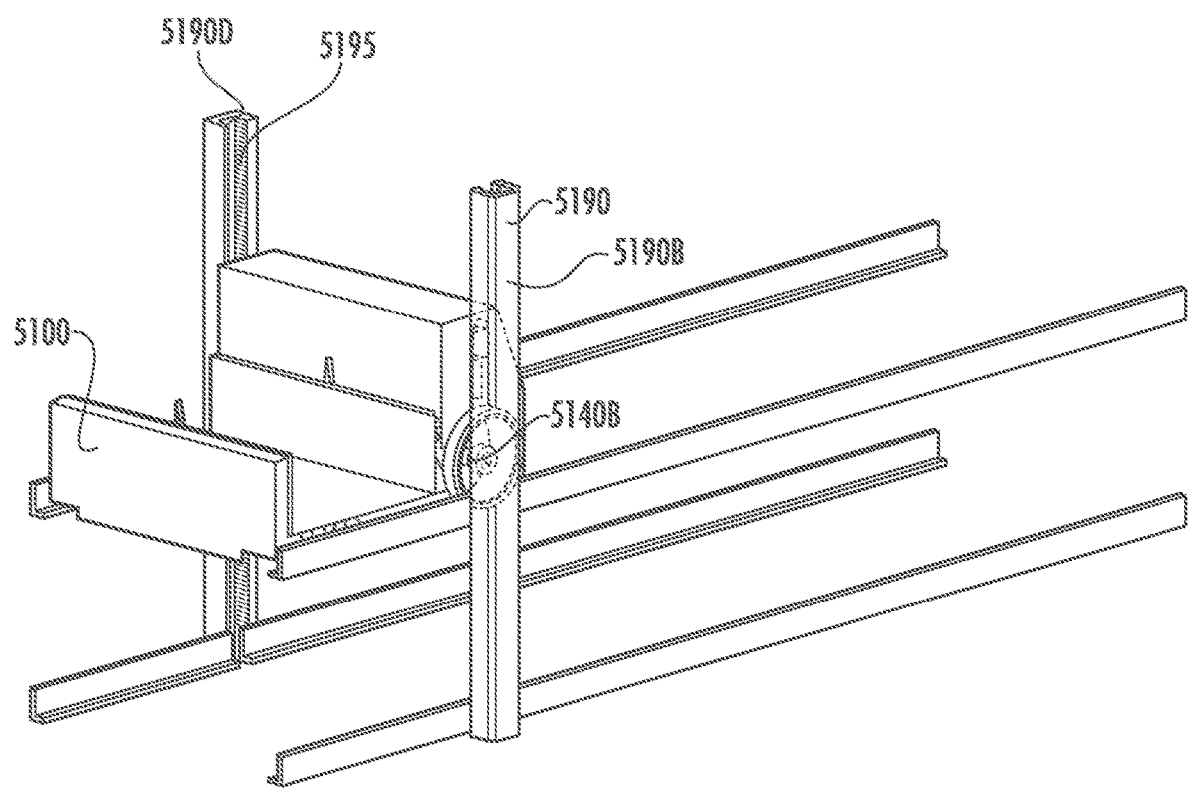
Figure 27E:
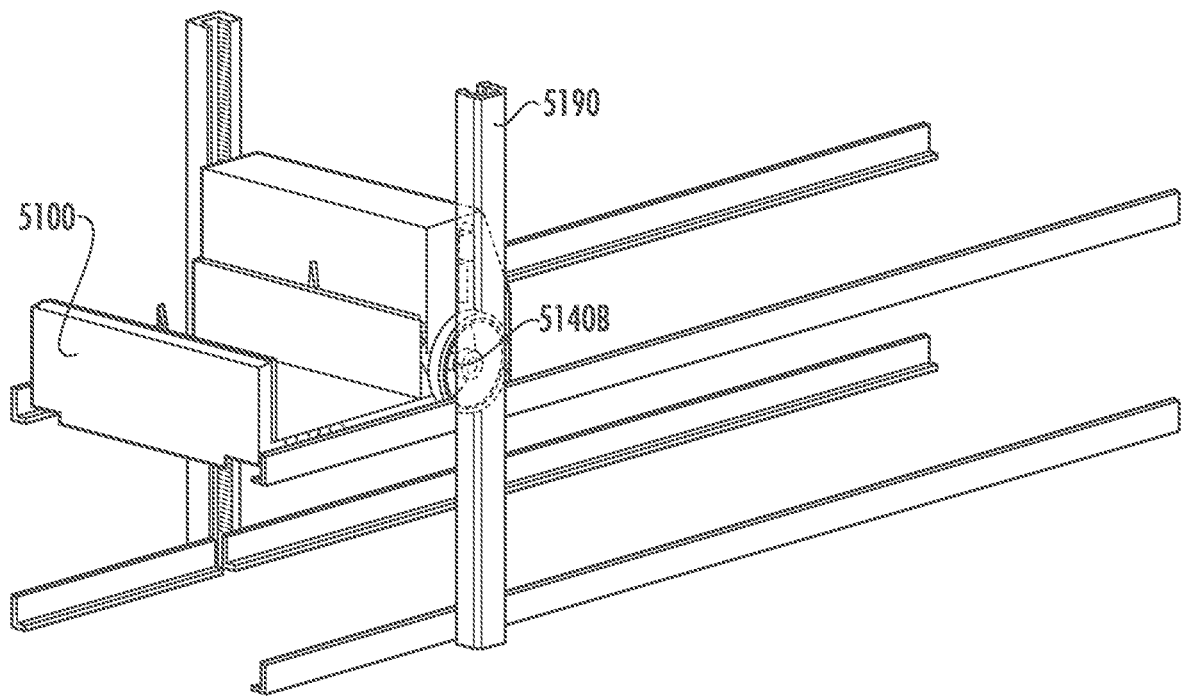

In FIGS. 27A through 27C, the bot 5100 travels horizontally from right to left across the page. At FIGS. 27D to 27E, the drive gear 5140B (and not shown, but on the opposite side drive gear 5140A) and guide bearings are extended laterally away from the body of the bot 5100 to engage with the elevation track 5190. Each elevation track 5190 has a drive surface 5190D and a guide surface 5190B disposed opposite the drive surface 5190D and separated by a thickness of the elevation track 5190, and the drive surface includes a gear rack 5195, as described and shown elsewhere herein.

Figure 27F:
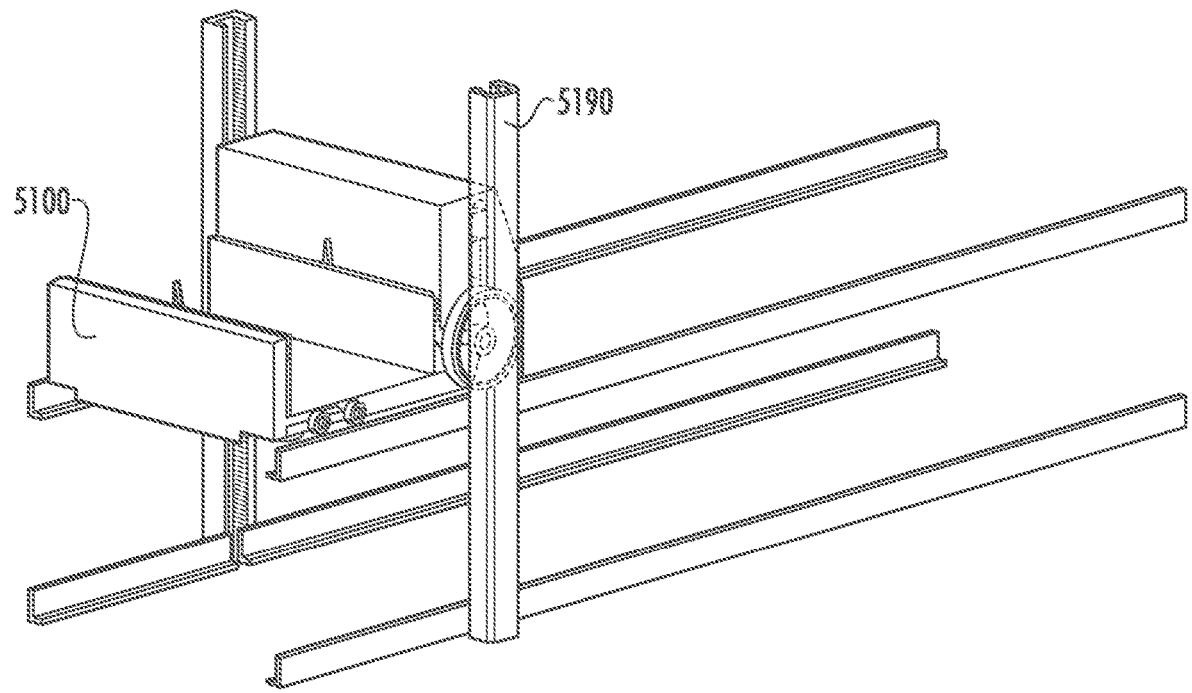
Figure 27G:
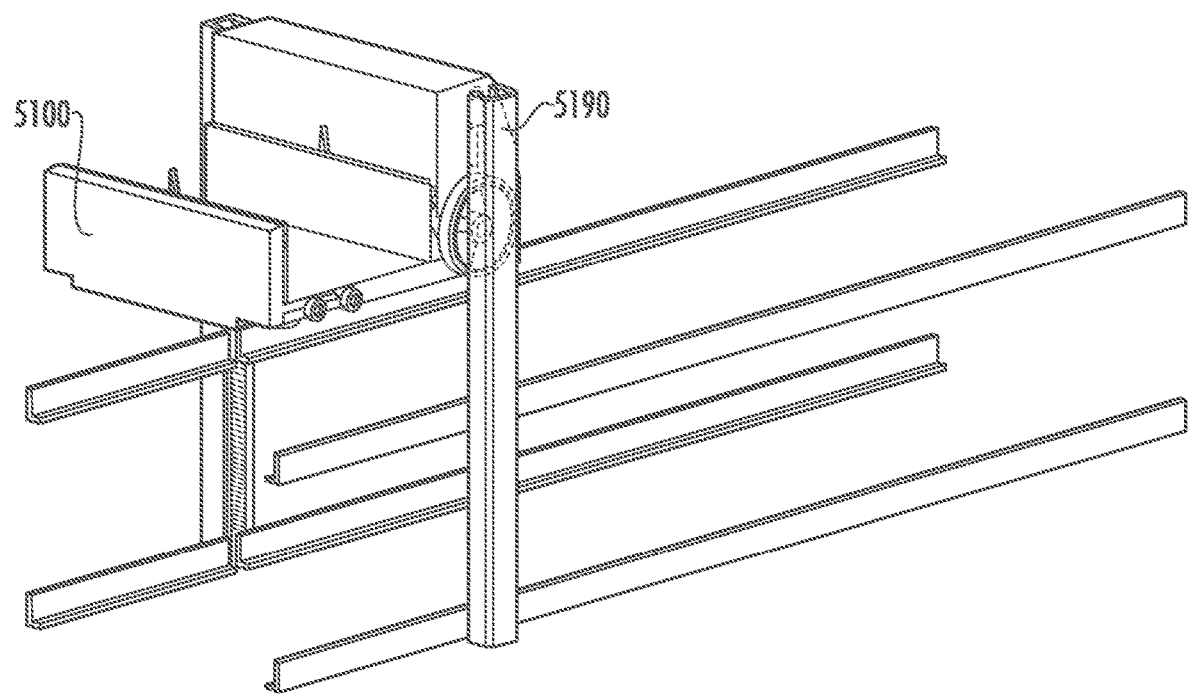

In FIGS. 27F to 27G, the bot 5100 travels vertically up the elevation track 5190.

Figure 28A:
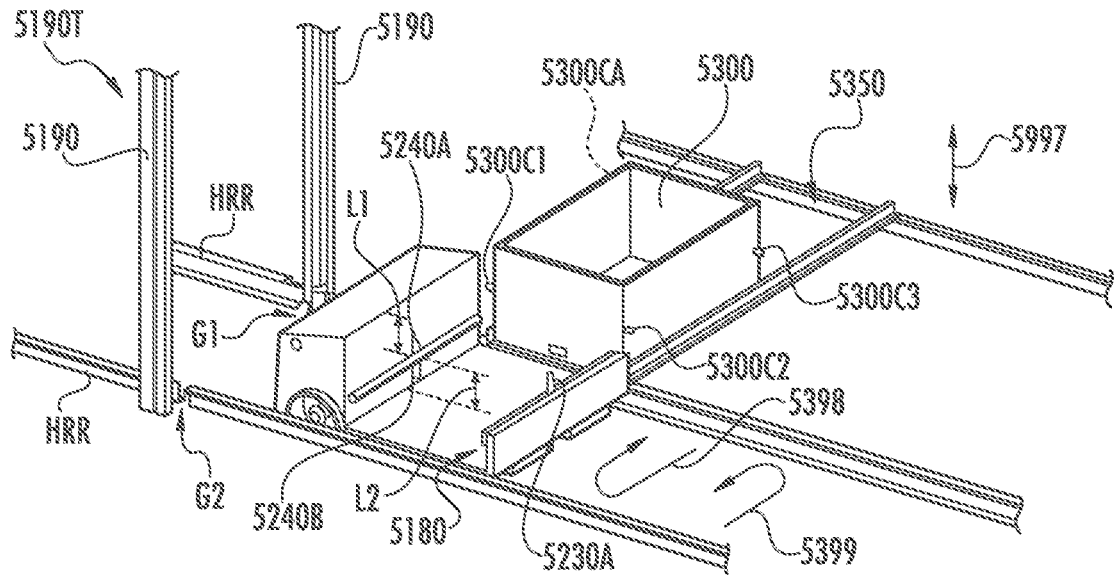
FIGS. 28A-28K are views of a vehicle illustrating a case or tote transfer mechanism in accordance with aspects of the disclosed embodiment.
Figure 28B:
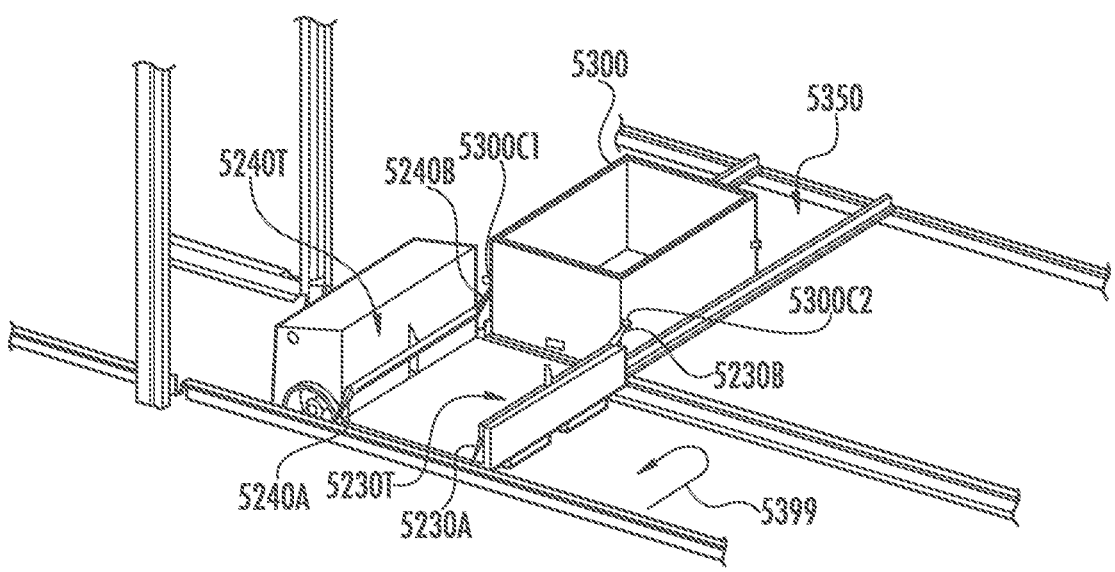
Figure 28C:
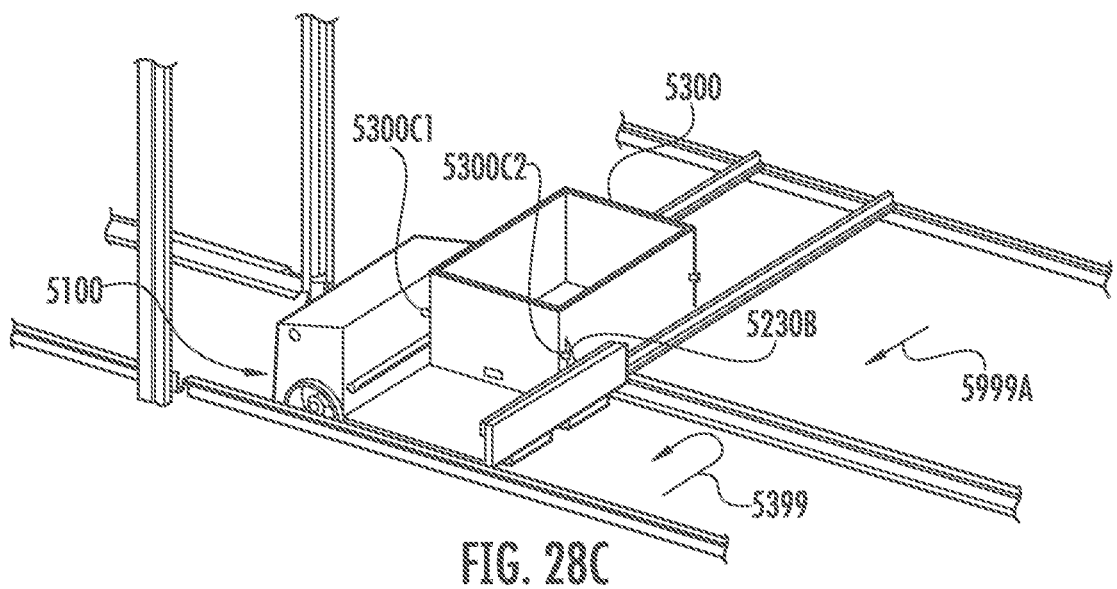
Figure 28D:
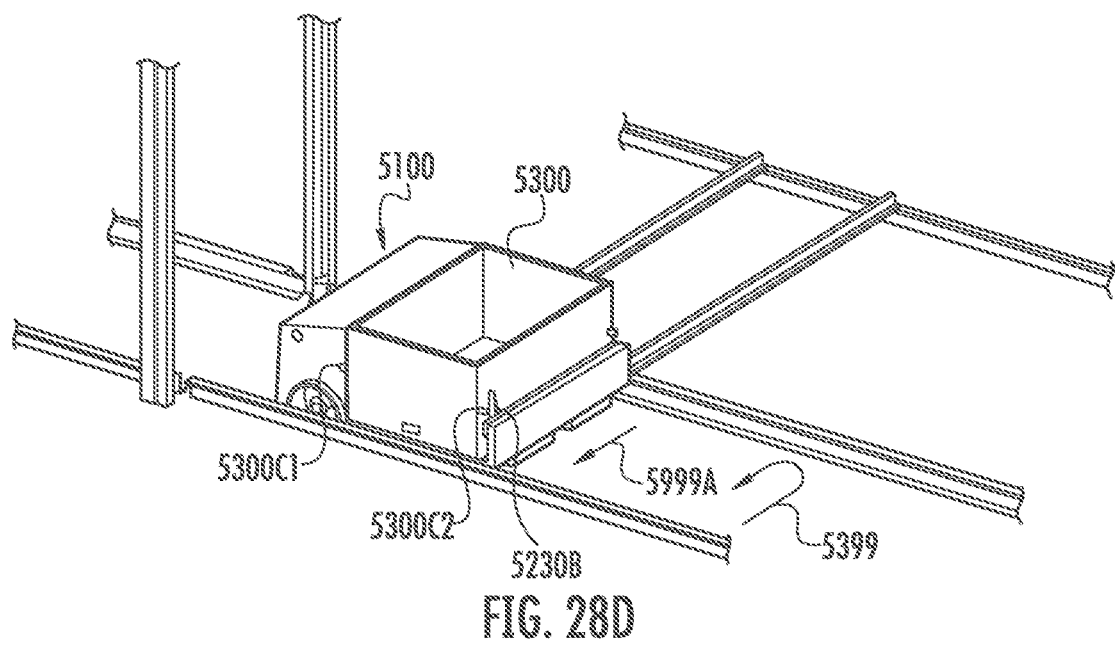
Figure 28E:
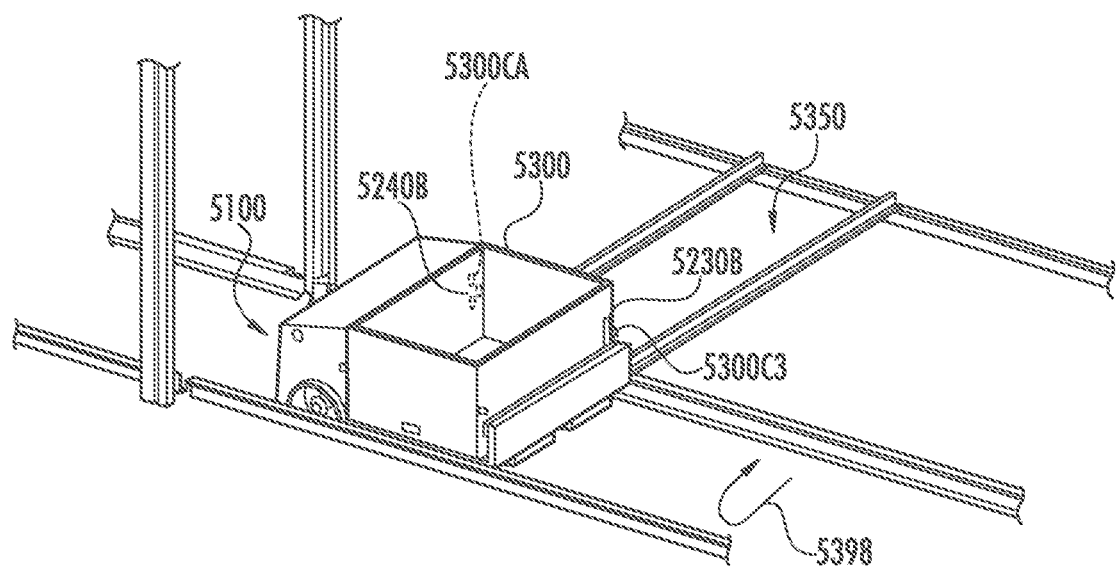
Figure 28F:
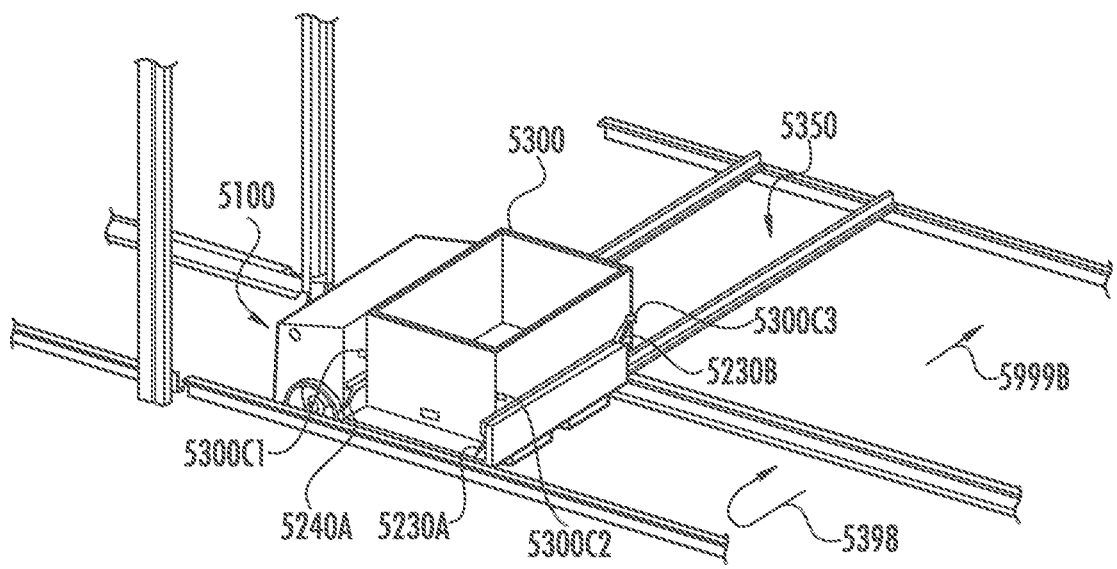
Figure 28G:
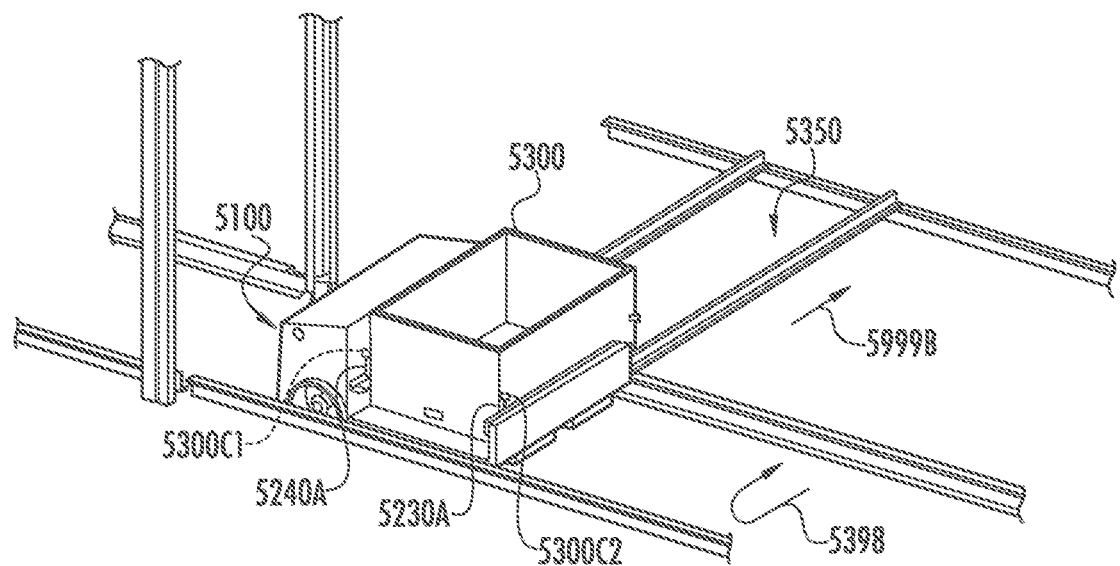
Figure 28H:
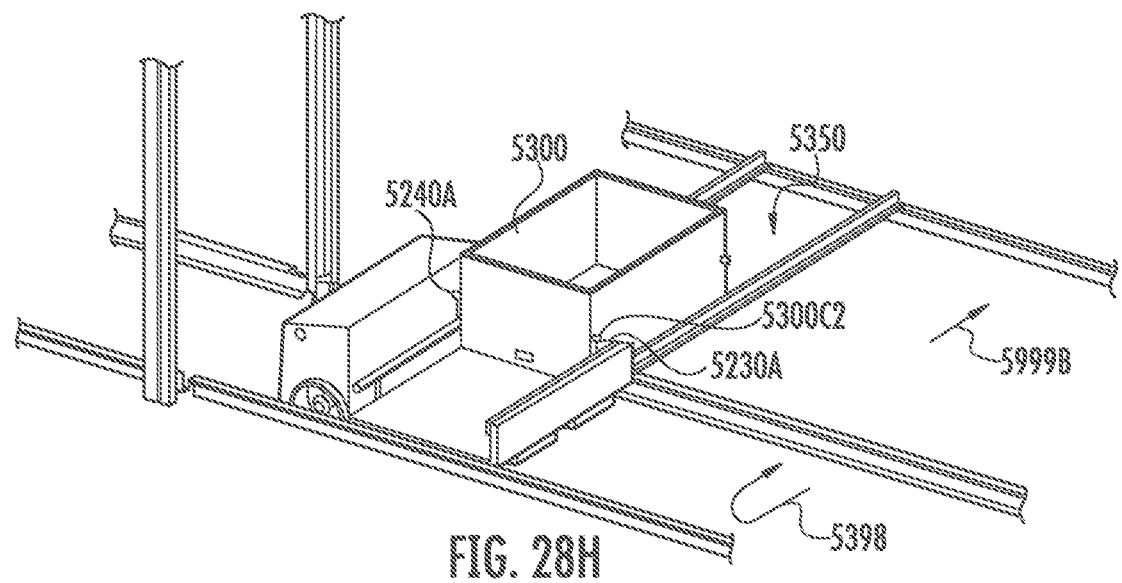
Figure 28I:
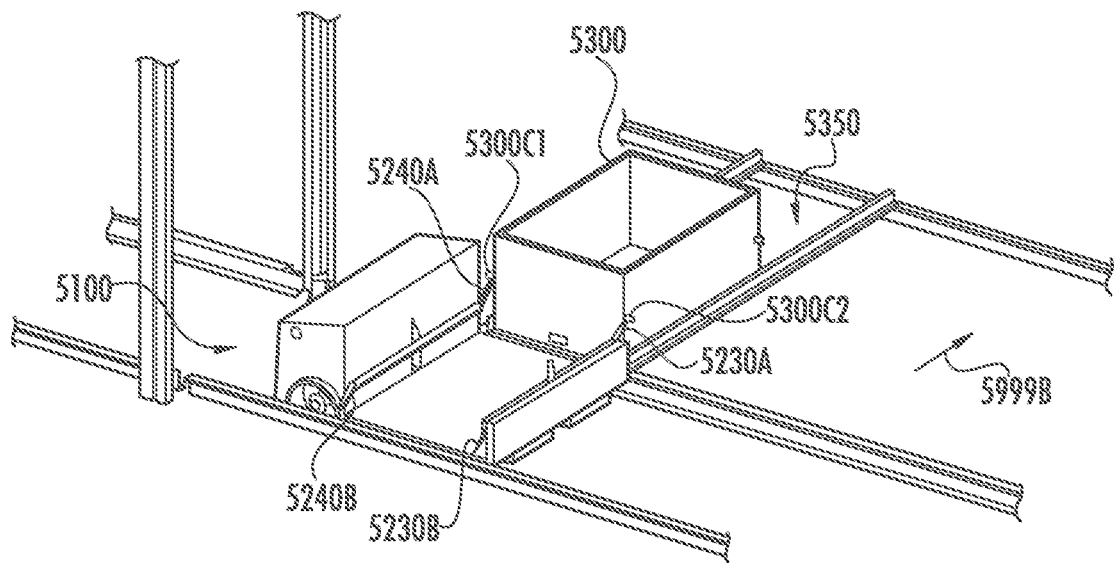
Figure 28J:
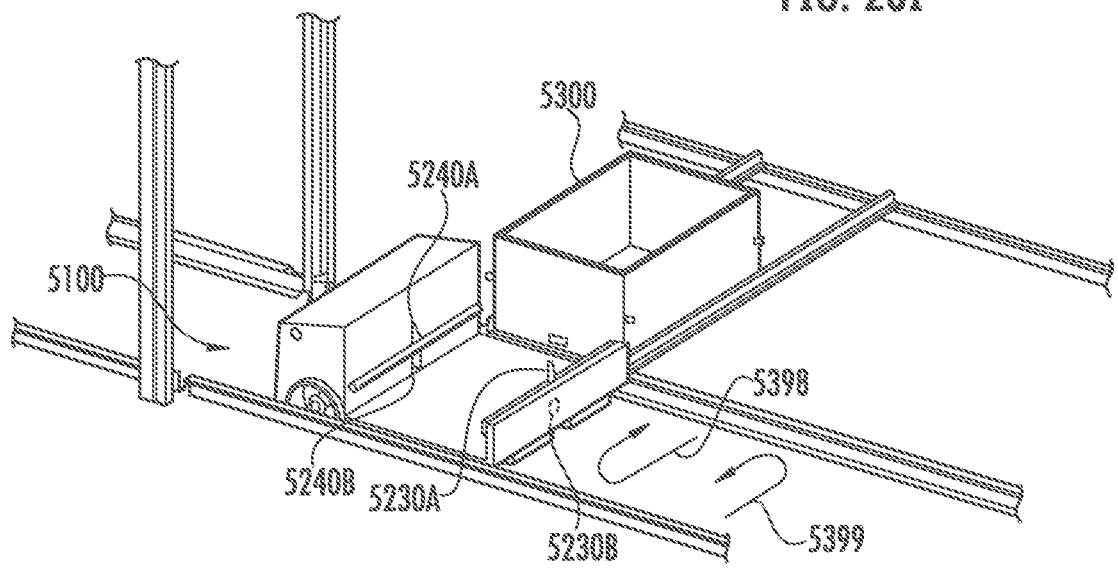
Figure 28K:
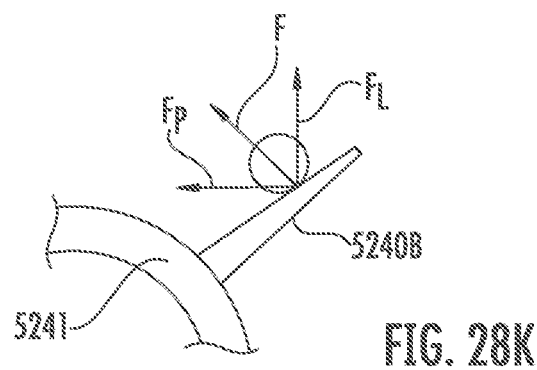
Figure 29:
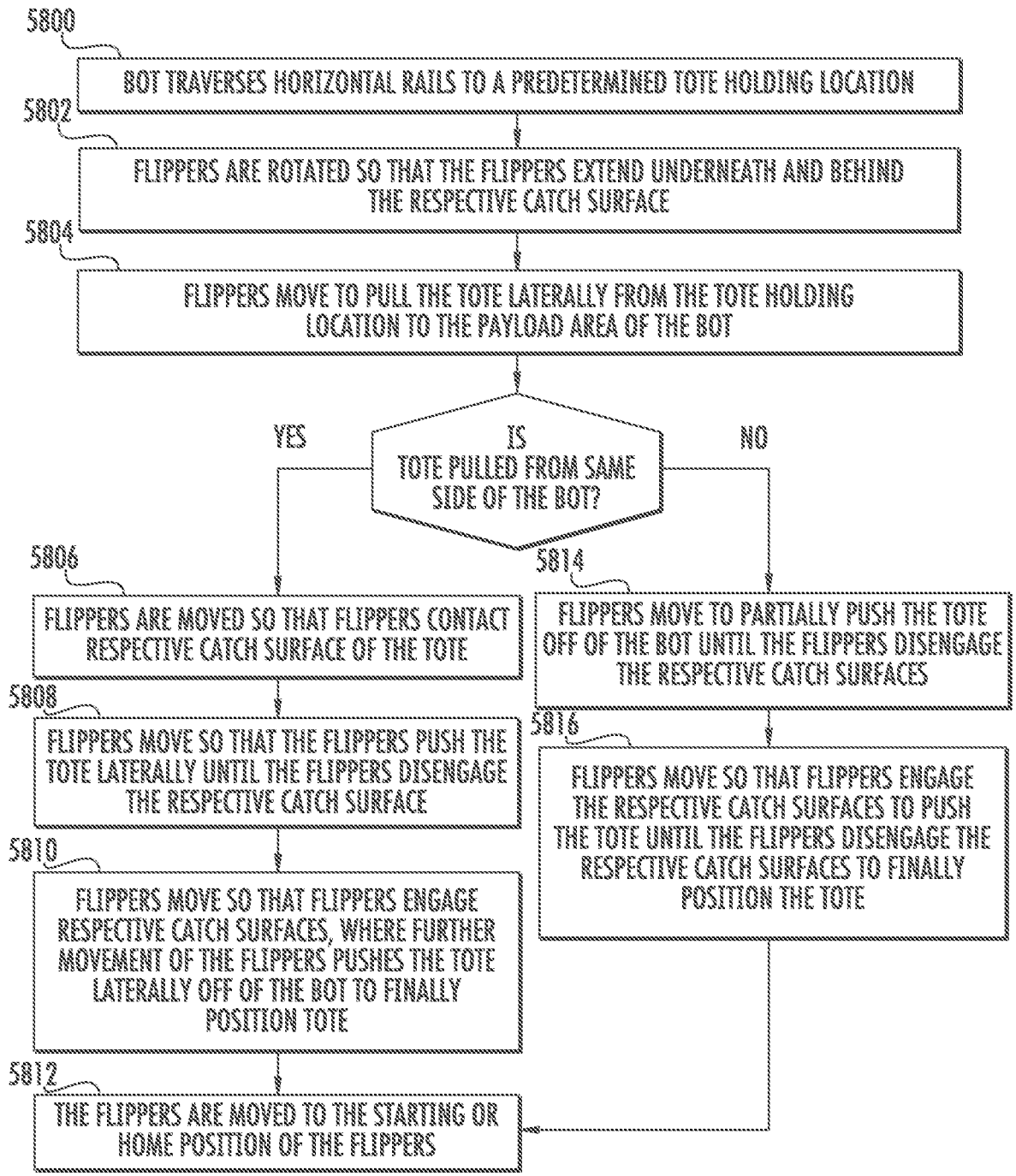
FIG. 29 is a flow diagram in accordance with aspects of the disclosed embodiment.

Referring to FIGS. 28A-28J an exemplary operation of a tote 5300 transfer between a tote holding location 5350 and the bot 5100 will be provided. In one aspect the bot 5100 traverses horizontal rails HRR to a predetermined tote holding location 5350 (FIG. 29, Block 5800). The bot 5100 may include any suitable sensors or odometry to facilitate location determination of the bot 5100 relative to the tote holding location 5350. When the tote 5300 is substantially aligned with the payload area 5180 the flippers 5230B, 5240B (and flippers 5230A, 5240A) are rotated in direction 5399 so that the flippers extend underneath and behind the respective catch surface 5300C1, 5300C2 to cam the tote 5300 into the payload area 5180 of the bot 5100 as described above with respect to FIG. 28K (FIG. 29, Block 5802). The flippers 5230B, 5240B continue to move in direction 5399 to pull the tote laterally in direction 5999A from the tote holding location 5350 to the payload area 5180 of the bot 5100 until the tote 5300 is located at a predetermined loaded position within the payload area 5180 as shown in FIG. 28D (FIG. 29, Block 5804). In one aspect, the bot 5100 includes any suitable sensors for sensing a position of the tote 5300 relative to the payload area 5180 for stopping movement of the recirculating bidirectional traversers 5230T, 5240T when the tote 5300 reaches the predetermined position within the payload area 5180. To transfer the tote 5300 from the bot to the tote holding location 5350 from the same side of the bot 5100 that the tote was transferred onto the bot 5100, the flippers 5230B, 5240B (and flippers 5230A, 5240A) are moved in direction 5398 so that flippers 5230B, 5240B contact respective catch surface 5300C3, 5300C4 of the tote 5300 (FIG. 29, Block 5806). The flippers 5230B, 5240B continue to move in direction 5398 so that the flippers 5230B, 5240B push the tote 5300 laterally in direction 5999B until the flippers 5230B, 5240B disengage the respective catch surface 5300C3, 5300C4 of the tote 5300 so that the tote 5300 is partially pushed off of the bot 5100 (FIG. 29, Block 5808). The flippers 5230A, 5240A (and flippers 5230B, 5240B) continue to move in direction 5398 so that flippers 5230A, 5240A engage respective catch surface 5300C1, 5300C2 where further movement of the flippers 5230A, 5240A in direction 5398 pushes the tote 5300 laterally in direction 5999B off of bot 5100 where the tote 5300 is finally positioned in the tote holding location 5350 when the flippers 5230A, 5240A disengage the respective catch surfaces 5300C1, 5300C2 as the flippers 5230A, 5240A move in direction 5398 (FIG. 29, Block 5810). The flippers 5230A, 5230B, 5240A, 5240B are moved in direction 5399 or direction 5398 to the starting or home position of the flippers 5230A, 5230B, 5240A, 5240B as shown in FIG. 28J, where the home position may be along the centerline CL of the bot 5100 or at any other suitable position along the path of travel of the flippers 5230A, 5230B, 5240A, 5240B (FIG. 29, Block 5812).

Where the tote 5300 is to be pushed off of the opposite lateral side the bot 5100 than the lateral side from which the tote 5300 was pushed onto the bot 5100, referring to FIG. 28D, the flippers 5230B, 5240B (which are engaged with respective catch surfaces 5300C1, 5300C2) move in direction 5399 to partially push the tote 5300 off of the bot in direction 5999A until the flippers 5230B, 5240B disengage the respective catch surfaces 5300C1, 5300C2 (FIG. 29, Block 5814). The flippers 5230A, 5240A (along with flippers 5230B, 5240B) continue to move in direction 5399 so that the flippers 5230A, 5240A engage the respective catch surface 5300C1, 5300C2 to push the tote 5300 in direction 5999A until the flippers 5230A, 5240A disengage the respective catch surfaces 5300C1, 5300C2 to finally position the tote 5300 at a tote holding location (FIG. 29, Block 5816) in a manner substantially similar to that described above and the flippers 5230A, 5240A, 5230B, 5240B are returned to the starting position (FIG. 29, Block 5812).

Figure 30:
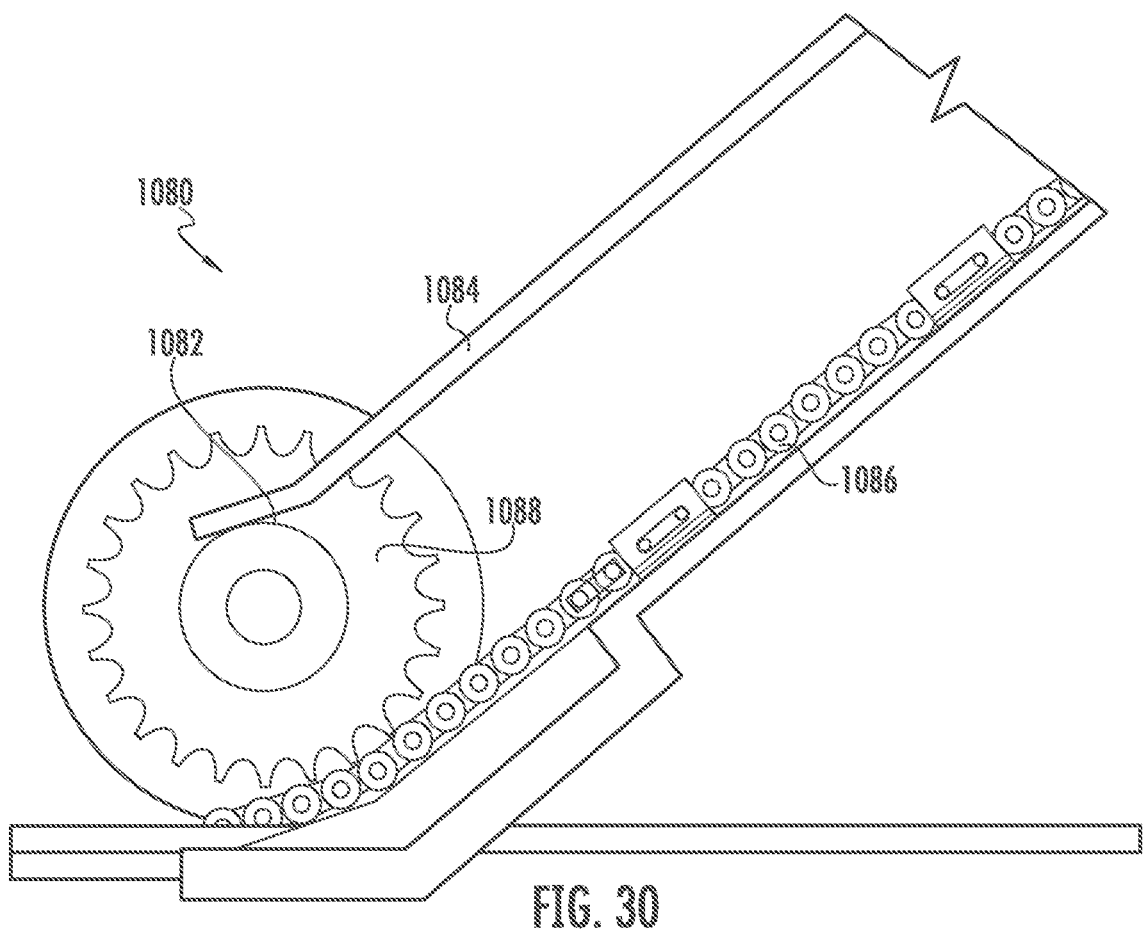
FIG. 30 is a side schematic view of a transmission in accordance with aspects of the disclosed embodiment.

Referring also to FIG. 30, there is shown a side schematic view of a wheel with a drive gear such as sprocket 1080 engaging a ramp. Here, counter bearing 1082 engages counter rail 1084 while chain 1086 (also referred to herein as a linear drive mount) is engaged by sprocket 1088. FIG. 30 shows initial engagement where a rubber backing may be provided to enable chain meshing and limit engagement wear. It is understood that sprocket 1088 may be mounted on shaft 122 as shown in FIG. 8. As described above, with the relative position between spline 126 and shaft 122 shown in FIG. 8, there is rotational play between spline 126 and shaft 122 such that sprocket 1088 can freely engage chain 1086.

Figure 31A:
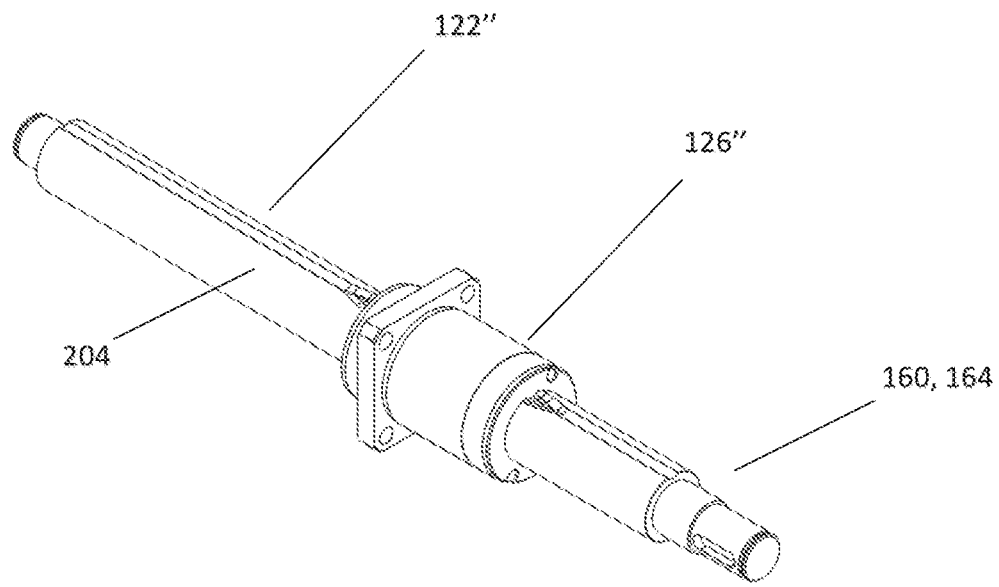
FIG. 31A is an isometric view of a hub mounted on a shaft.
Figure 31B:
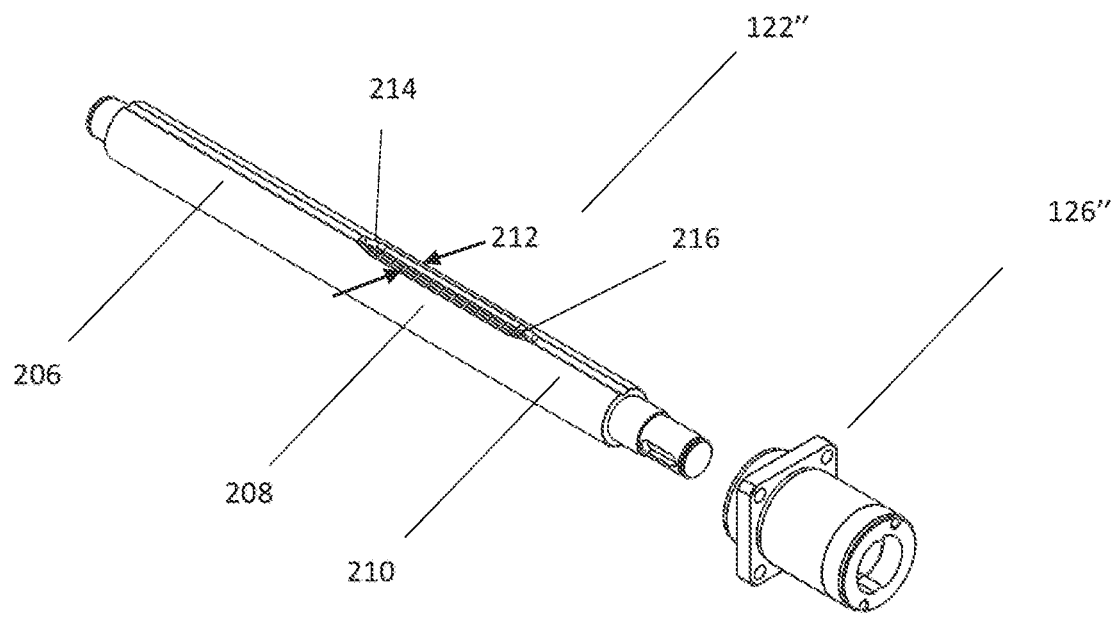
FIG. 31B is an isometric view of a shaft and hub shown in an exploded arrangement.
Figure 32A:
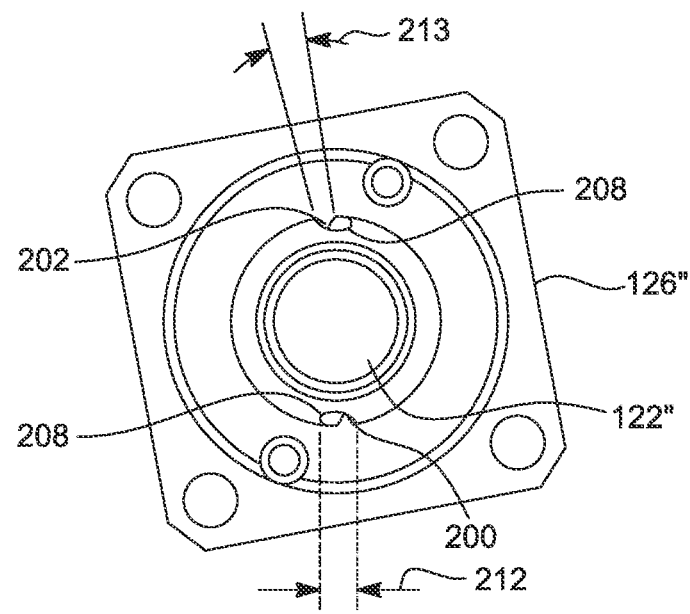
FIG. 32A is an end view of a hub.
Figure 32B:
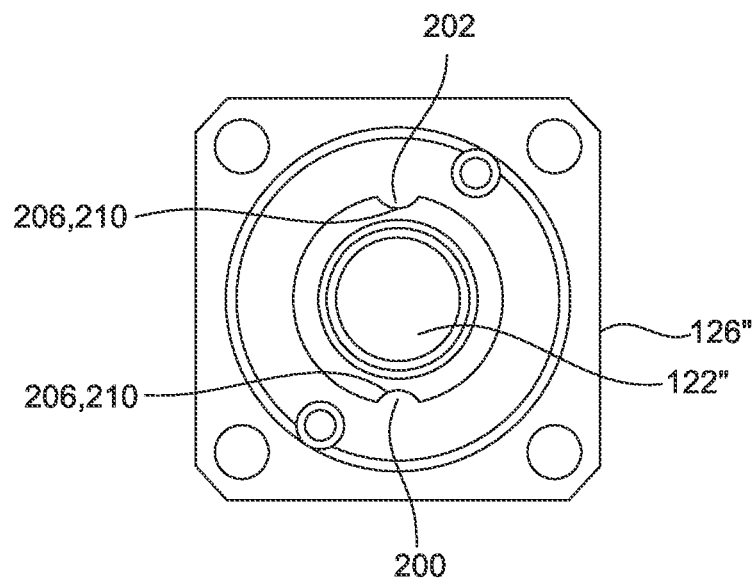
FIG. 32B is an end view of a hub.

FIGS. 31A-34B show examples of shafts and hubs according to further embodiments of the present technology. Referring now to FIG. 31A, there is shown an isometric view of shaft 122" and ball spline hub 126" shown in an assembled arrangement with ball spline hub 126" shown in the position with compliance or rotational play between shaft 122" and ball spline hub 126". FIGS. 31A, 31B & 32A, 32B show features as shown in FIGS. 13 and 14 previously described. Referring also to FIG. 31B, there is shown an isometric view of shaft 122" and ball spline hub 126" shown in an exploded arrangement. Referring also to FIG. 32A, there is shown an end view of shaft 122" and ball spline hub 126" shown in a rotationally compliant region with rotational play between hub 126" and shaft 122". Referring also to FIG. 32B, there is shown an end view of shaft 122" and ball spline hub 126" shown in a non-rotationally compliant region with little or no rotational play between hub 126" and shaft 122". Ball spline hub 126" mounts to wheel 12 and moves axially on shaft 122". Ball spline hub 126" has recirculating balls 200, 202. Shaft 122" has pinion mounting portion 160, counterwheel mounting portion 164 and grooved portion 204. Grooved portion 204 has race portions 206, 210 that mate with the recirculating balls 200, 202 of hub 126" such that when hub 126" mates with portions 206, 210 (there is little to no rotational play between hub 126" and shaft 122" as shown in FIG. 32B. Grooved portion 204 further has portion 208 that mates with the recirculating balls 200, 202 of hub 126" such that when hub 126" mates with portion 208 there is a predetermined rotational play 213 between hub 126" and shaft 122" as shown in FIG. 32A where the external race has been widened 212. Lead ins 214, 216 are provided to allow a smooth transition between the hub 126" and portions 206, 208, 210.

Figure 33A:
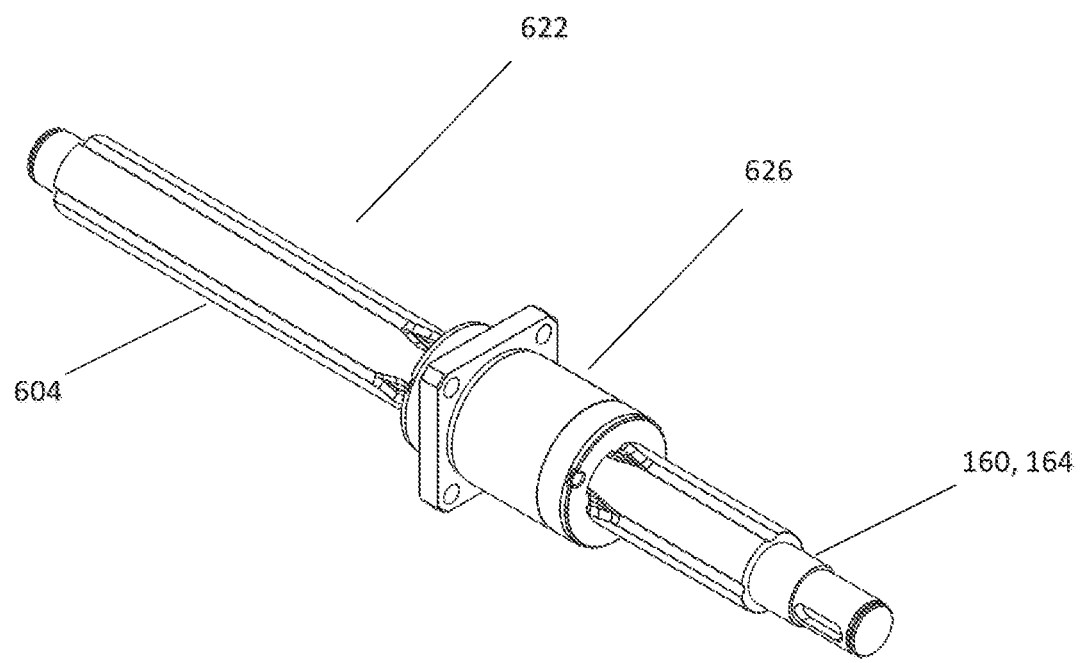
FIG. 33A is an isometric view of a hub mounted on a shaft.
Figure 33B:
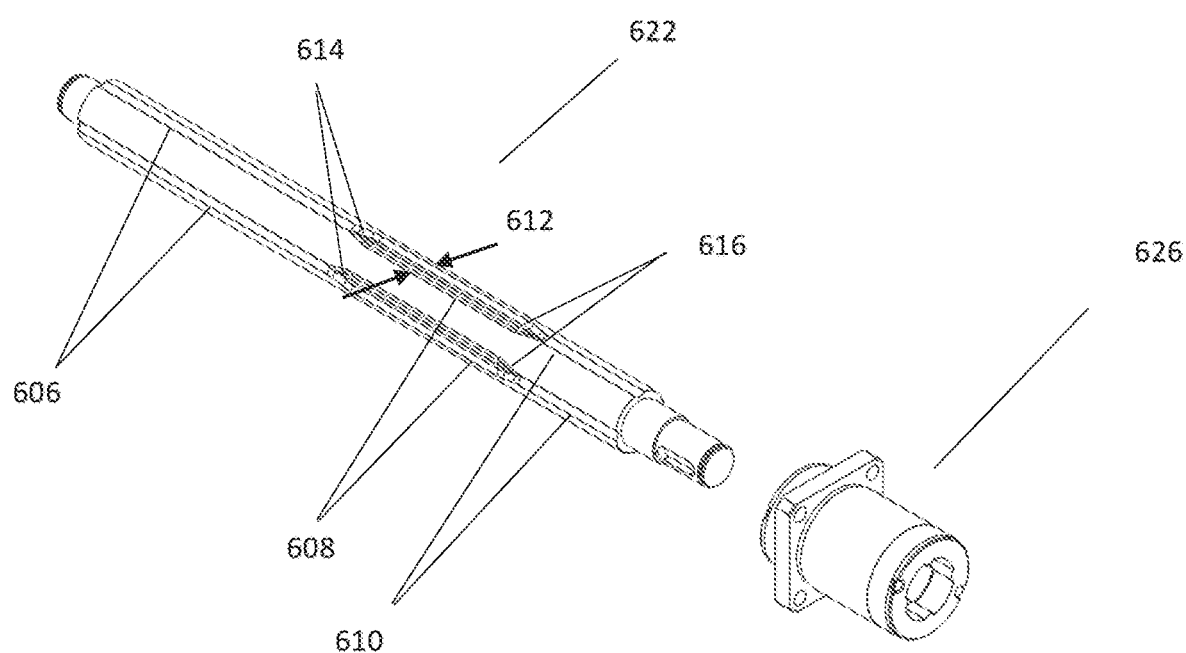
FIG. 33B is an isometric view of a shaft and hub shown in an exploded arrangement.
Figure 34A:
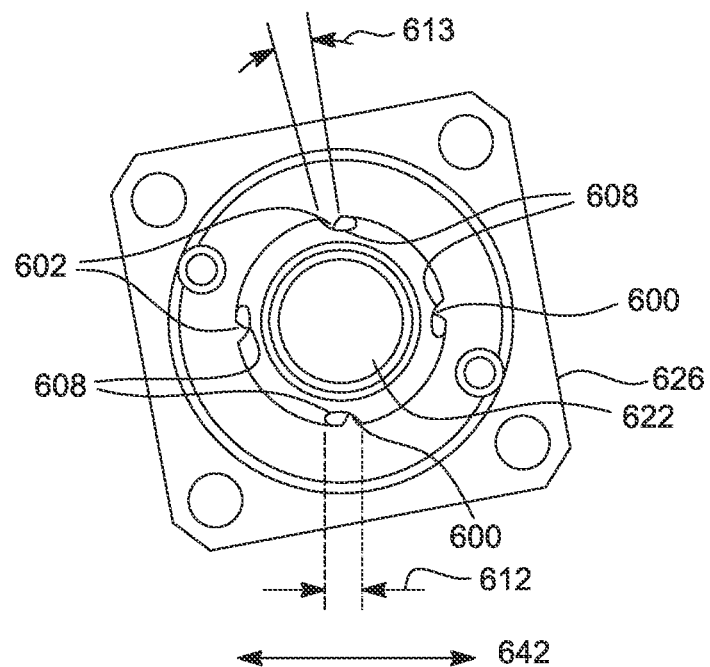
FIG. 34A is an end view of a hub.
Figure 34B:
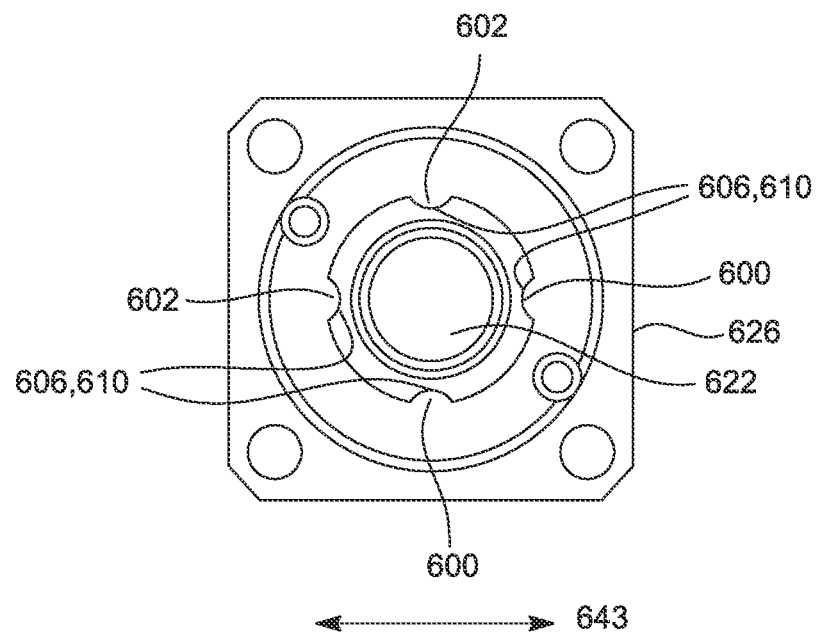
FIG. 34B is an end view of a hub.

Referring now to FIG. 33A, there is shown an isometric view of alternate embodiment shaft 622 and ball spline hub 626 shown in an assembled arrangement with ball spline hub 626 shown in the position with compliance or rotational play between shaft 622 and ball spline hub 626. Referring also to FIG. 33B, there is shown an isometric view of shaft 622 and ball spline hub 626 shown in an exploded arrangement. Referring also to FIG. 34A, there is shown an end view of shaft 622 and ball spline hub 626 shown in a rotationally compliant region with compliance or rotational play between hub 626 and shaft 622. Referring also to FIG. 34B, there is shown an end view of shaft 622 and ball spline hub 626 shown in a non-rotationally compliant region with little or no rotational play between hub 626 and shaft 622. Ball spline hub 626 mounts to wheel 12 and moves axially on shaft 622. Ball spline hub 626 has four sets of recirculating balls 600, 602. In alternate aspects, more or less sets of recirculating balls may be provided. Shaft 622 has pinion mounting portion 160, counterwheel mounting portion 164 and grooved portion 604. Grooved portion 604 has four race portions 606, 610 that mate with the recirculating balls 600, 602 of hub 626 such that when hub 626 mates with portions 606, 610 there is little to no rotational play between hub 626 and shaft 622 as shown in FIG. 34B. In alternate aspects, more or less race portions may be provided. Grooved portion 604 further has portion 608 that mates with the recirculating balls 600, 602 of hub 626 such that when hub 626 mates with portion 608 there is a predetermined rotational play 613 between hub 626 and shaft 622 as shown in FIG. 34A where the external race has been widened 612. Lead ins 614, 616 are provided to allow a smooth transition between the hub 626 and portions 606, 608, 610. The embodiment shown in FIGS. 33-34 differs from that shown in FIGS. 31-32 in that an additional pair of recirculating balls and mating grooved portions are provided in order to stiffen the assembly in a radial direction 642 as shown in FIG. 34A while the assembly is in the rotationally compliant region with compliance or rotational play between hub 626 and shaft 622 and where radial play is controlled in all directions as compared to the embodiments shown in FIGS. 31-32. Similarly, the additional pair of recirculating balls and mating grooved portions stiffen the assembly in a radial direction 643 as shown in FIG. 34B while the assembly is in the rotationally non-compliant region with little or no compliance or rotational play between hub 626 and shaft 622 and where radial play is controlled in all directions as compared to the embodiment shown in FIGS. 31-32. This feature is accomplished with the addition of the second pair of recirculating balls and mating grooved portions perpendicular to those shown with respect to FIGS. 31-32. In alternate aspects, less sets of recirculating balls and mating grooved portions, for example, three may be provided to achieve the same result. In a similar fashion, more sets of recirculating balls and mating grooved portions, for example, five, six or otherwise may be provided to achieve a similar result. By way of further illustration, a similar result is obtained in the embodiment shown in FIGS. 11 and 12 where the outer diameter of shaft 122 cooperates with the root diameter of the spline of spline hub 126 (or the inner diameter of hub 126 cooperates with the root diameter of spline shaft 126) to control radial play in all directions as compared to the embodiment shown in FIGS. 31-32 irrespective of whether hub 126 is in a rotationally or non-rotationally compliant region of shaft 122.

We claim:

1. A mobile robot configured to travel in a vertical or inclined passage within an automated retrieval and storage system, the passage comprising a linear drive mount, the mobile robot comprising:
   a compliant drive assembly for moving the mobile robot in the passage, the compliant drive assembly comprising:
      a hub comprising a first plurality of spline sets;
      a shaft comprising a second plurality of spline sets, the shaft configured to be rotated about an axis of rotation and the hub configured to engage the shaft by the first plurality of spline sets of the hub engaging the second plurality of spline sets of the shaft, the shaft further configured to be extended axially along the axis of rotation;
      a drive gear mounted on an end of the shaft, the drive gear configured to move into engagement with the linear drive mount;
      wherein the first and second pluralities of spline sets are configured for rotational play between the first and second plurality of spline sets, the rotational play allowing a degree of free rotation of the drive gear relative to the linear drive mount to prevent jamming of the drive gear against the linear drive mount when the drive gear moves into engagement with the linear drive mount upon extension of the shaft.

2. The mobile robot of claim 1, wherein each spline set of the first and second plurality of spline sets comprise a pair of diametrically opposed splines.

3. The mobile robot of claim 1, wherein the first and second pluralities of spline sets each comprise two sets of spline sets.

4. The mobile robot of claim 3, wherein one spline set is offset degrees with respect to the other spline set in each of the first and second pluralities of spline sets.

5. The mobile robot of claim 1, wherein a spline of the second plurality of spline sets on the shaft has a length along the shaft, the spline comprising a first section having a first width and a second section having a second width greater than the first width.

6. The mobile robot of claim 5, wherein the first and second pluralities of spline sets are configured for rotational play between the first and second plurality of spline sets when a spline of the first plurality of splines on the hub aligns with the second section of the spline on the shaft.

7. The mobile robot of claim 5, wherein the first and second pluralities of spline sets are configured not to have rotational play between the first and second plurality of spline sets when a spline of the first plurality of splines on the hub aligns with the first section of the spline on the shaft.

8. The mobile robot of claim 1, wherein a wheel is affixed to the hub, the wheel configured to support the robot as the robot moves horizontally.

9. The mobile robot of claim 1, wherein the mobile robot is configured to move up or down within the passage by the rotation of the drive gear against the linear drive mount.

10. The mobile robot of claim 1, wherein the drive gear comprises a pinion gear and the linear drive mount comprises a rack comprising teeth configured to mesh with the gears of the pinion.

11. The mobile robot of claim 1, wherein the first and second pluralities of spline sets each comprise three sets of spline sets.

12. The mobile robot of claim 11, wherein one spline set is offset degrees with respect to the other spline set in each of the first and second pluralities of spline sets.

13. A mobile robot configured to travel in a vertical or inclined passage within an automated retrieval and storage system, the passage comprising a linear drive mount, the mobile robot comprising:
   a compliant drive assembly for moving the mobile robot in the passage, the compliant drive assembly comprising:
      a hub comprising a first plurality of spline sets, each spline set in the first plurality of spline sets comprising two diametrically opposed spines;
      a shaft comprising a second plurality of spline sets,
      each spline set in the second plurality of spline sets comprising two diametrically opposed spines, the shaft configured to be rotated about an axis of rotation, the shaft further configured to be extended axially along the axis of rotation;
      a drive gear mounted on an end of the shaft, the drive gear configured to move into engagement with the linear drive mount;
      wherein the shaft is configured to exert torque on the hub by engagement between the first and second pluralities of spline sets, there being rotational play between first and second pluralities of spline sets, the rotational play allowing a degree of free rotation of the drive gear relative to the linear drive mount to prevent jamming of the drive gear against the linear drive mount when the drive gear moves into engagement with the linear drive mount upon extension of the shaft.

14. The mobile robot of claim 13, wherein the hub is constrained against rotation while there is rotational play between first and second pluralities of spline sets.

15. The mobile robot of claim 13, wherein the first and second pluralities of spline sets each comprise two sets of spline sets, offset from each other by 90 degrees.

16. The mobile robot of claim 13, wherein, in addition to allowing rotational play, the second set of splines prevent radial translation along a first axis through the first set of splines, and the first set of splines prevent radial translation along a second axis through the second set of splines.

17. The mobile robot of claim 13, wherein the first and second pluralities of spline sets each comprise three sets of spline sets.

18. The mobile robot of claim 13, wherein a first spline of the first plurality of splines comprises one or more balls configured to mate with a spline of the second plurality of splines.

19. The mobile robot of claim 13, wherein a wheel is affixed to the hub, the wheel configured to support the robot as the robot moves horizontally.

20. The mobile robot of claim 13, wherein the mobile robot is configured to move up or down within the passage by the rotation of the drive gear against the linear drive mount.

21. A mobile robot configured to travel in a vertical or inclined passage within an automated retrieval and storage system, the passage comprising a linear drive mount, the mobile robot comprising:
a compliant drive assembly for moving the mobile robot in the passage, the compliant drive assembly comprising:
a hub comprising a first plurality of spline sets;
a shaft comprising a second plurality of spline sets,
the second plurality of spline sets having a length along the shaft, the shaft having a first axial section where the second plurality of spline sets have a first width, and the shaft having a second axial section where the second plurality of spline sets have a second width less than the first width, the shaft configured to be rotated about an axis of rotation, the shaft further configured to be extended axially along the axis of rotation;
a drive gear mounted on an end of the shaft, the drive gear configured to move into engagement with the linear drive mount;
wherein there is rotational play between the first and second plurality of spline sets when the first section of the shaft is within the hub, the rotational play allowing a degree of free rotation of the drive gear relative to the linear drive mount to prevent jamming of the drive gear against the linear drive mount when the drive gear moves into engagement with the linear drive mount upon extension of the shaft.

22. The mobile robot of claim 21, wherein the first and second pluralities of spline sets each comprise two sets of spline sets, offset from each other by 90 degrees.

23. The mobile robot of claim 21, wherein, in addition to allowing rotational play, the second set of splines prevent radial translation along a first axis through the first set of splines, and the first set of splines prevent radial translation along a second axis through the second set of splines.

24. The mobile robot of claim 21, wherein the first and second pluralities of spline sets each comprise three sets of spline sets.

25. The mobile robot of claim 21, wherein a first spline of the first plurality of splines comprises one or more balls configured to mate with a spline of the second plurality of splines.

26. The mobile robot of claim 21, wherein there is not rotational play between the first and second plurality of spline sets when the second section of the shaft is within the hub.

27. The mobile robot of claim 21, further comprising a first motor for rotating the shaft about the axis of rotation.

28. The mobile robot of claim 21, further comprising a second motor for translating the shaft along the axis of rotation to position one of the first and second sections of the shaft within the hub.

29. The mobile robot of claim 21, further comprising a wheel mounted on the hub, the wheel engaged with a track for horizontal movement of the mobile robot when the second section of the shaft is engaged within the hub.

30. The mobile robot of claim 29, wherein the section of the shaft engaged within the hub transitions from the second section to the first section as the shaft moves the drive gear axially toward the linear drive mount.

* * * * *